United States Patent
Lee et al.

(10) Patent No.: US 8,185,711 B2
(45) Date of Patent: May 22, 2012

(54) MEMORY MODULE, A MEMORY SYSTEM INCLUDING A MEMORY CONTROLLER AND A MEMORY MODULE AND METHODS THEREOF

(75) Inventors: Jung-Bae Lee, Yongin-si (KR); Hoe-Ju Chung, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1461 days.

(21) Appl. No.: 11/723,821

(22) Filed: Mar. 22, 2007

(65) Prior Publication Data

US 2007/0271424 A1 Nov. 22, 2007

Related U.S. Application Data

(60) Provisional application No. 60/800,415, filed on May 16, 2006.

(30) Foreign Application Priority Data

May 16, 2006 (KR) ........................ 10-2006-0043917

(51) Int. Cl.
G06F 12/00 (2006.01)
(52) U.S. Cl. ............ 711/167; 711/5; 711/103; 711/105; 711/111; 711/154; 711/170
(58) Field of Classification Search .............. 711/5, 105, 711/111, 103, 167, 154, 170
See application file for complete search history.

(56) References Cited

U.S. PATENT DOCUMENTS 6,970,968 B1 11/2005 Holman (Continued)

FOREIGN PATENT DOCUMENTS

| JP | 02-310644 | 12/1990 |
|---|---|---|
| JP | 2000-057051 | 2/2000 |
| JP | 2004-152131 | 5/2004 |
| KR | 1020030012893 | 2/2003 |

(Continued)

OTHER PUBLICATIONS

Notice of Allowability from the Korean Patent Office dated Dec. 6, 2007 for corresponding Korean Patent Application No. 10-2006-0043917.

*Primary Examiner* — Midys Rojas
(74) *Attorney, Agent, or Firm* — Harness, Dickey & Pierce, P.L.C.

(57) ABSTRACT

A memory module, a memory system including a memory controller and a memory module and methods thereof. The example memory module may include a plurality of memory units each having an interface and at least one memory device. An example write operation method may include receiving a packet command at a given one of a plurality of memory units, each of the plurality of memory units including an interface and at least one memory device, extracting a command signal, an address and write data from the received packet command if the received packet command corresponds to a write operation, transferring the extracted write data to at least one memory device via write/read data lines internal to the given one memory unit and writing the transferred write data at the at least one memory device. An example read operation may include receiving a packet command at a given one of a plurality of memory units, each of the plurality of memory units including an interface and at least one memory device, extracting a command signal and an address from the received packet command if the received packet command corresponds to a read operation, transferring the extracted command signal and address to at least one memory device, receiving read data corresponding to the extracted command signal and address from the at least one memory device via write/read data lines internal to the given one memory unit and transmitting the received read data from the interface via read data lines external to the given one memory unit.

34 Claims, 17 Drawing Sheets

U.S. PATENT DOCUMENTS

| | | | |
|---|---|---|---|
| 2006/0064539 A1* | 3/2006 | Mukaida et al. | 711/103 |
| 2006/0129767 A1* | 6/2006 | Berenyi et al. | 711/154 |
| 2008/0195835 A1* | 8/2008 | Oberlaender et al. | 711/172 |
| 2009/0319745 A1* | 12/2009 | LaBerge | 711/167 |

FOREIGN PATENT DOCUMENTS

| | | |
|---|---|---|
| KR | 1020040062717 A1 | 7/2004 |
| KR | 1020040094181 A | 11/2004 |
| KR | 1020060009345 | 1/2006 |

* cited by examiner

FIG. 5

| A | CS | COM | RADD |

| B | CS | COM | CADD |
| FIRST GROUP OF WRITE DATA |
| SECOND GROUP OF WRITE DATA |

| C | CS | COM | CADD |

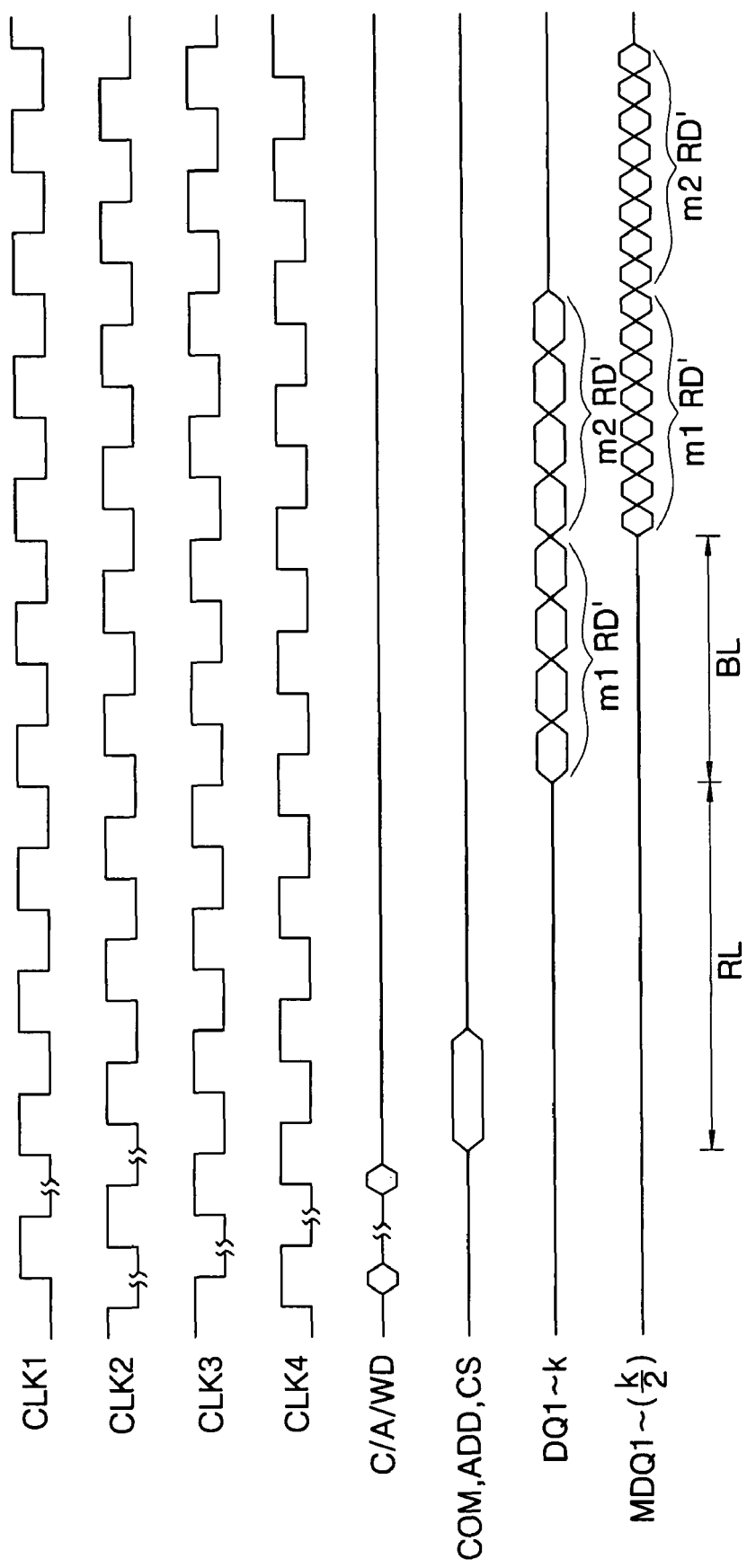

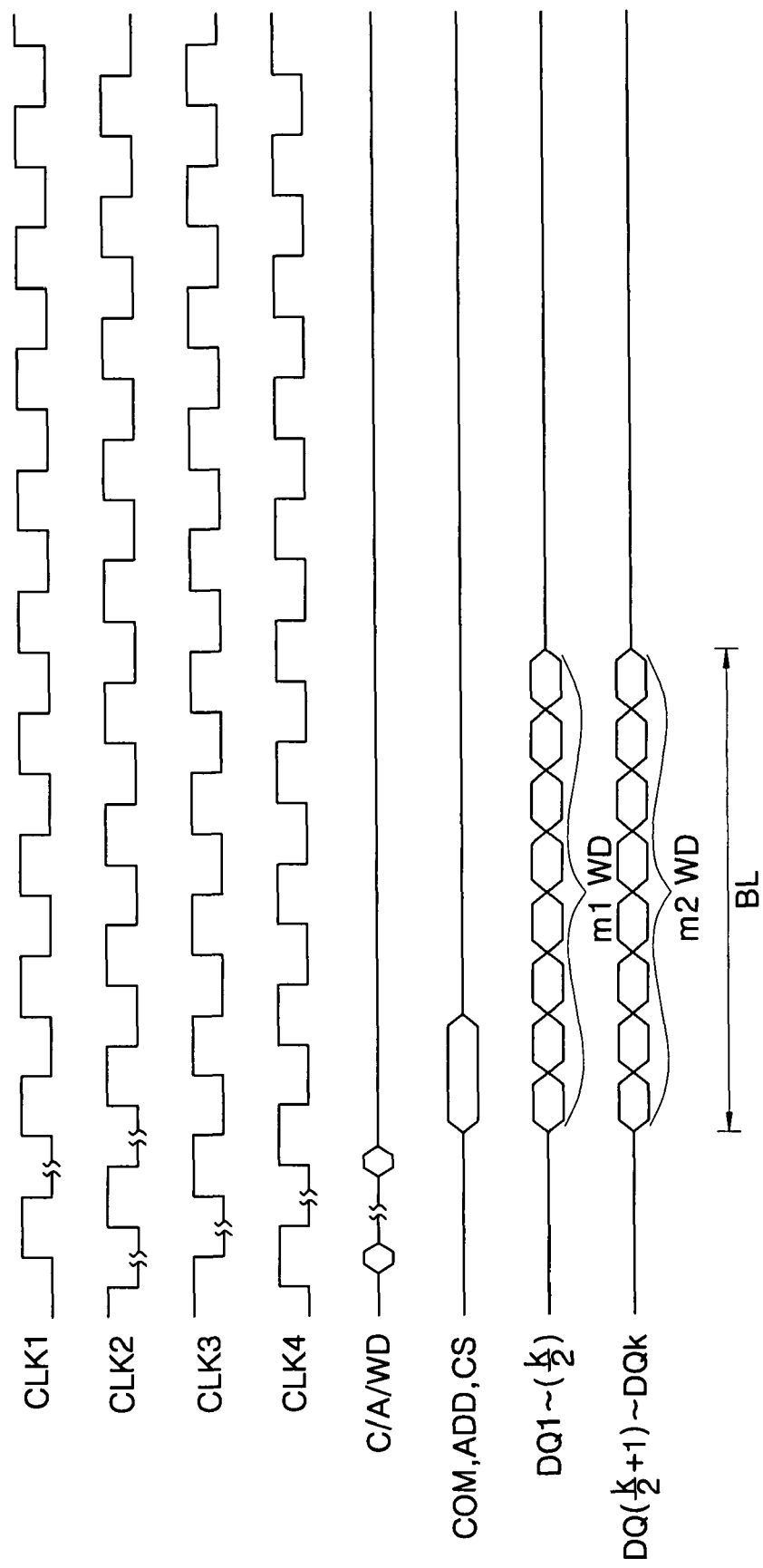

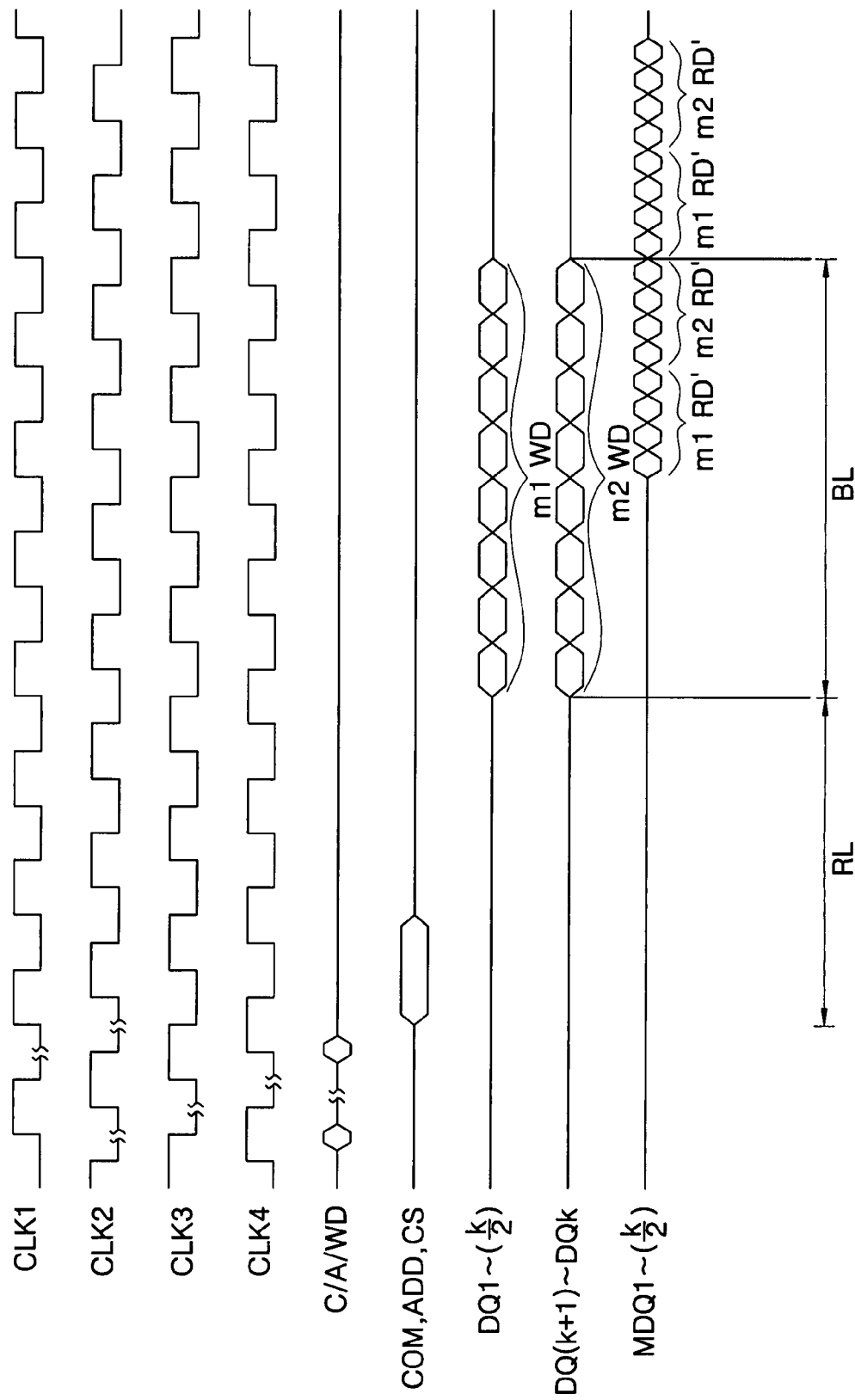

MEMORY MODULE, A MEMORY SYSTEM INCLUDING A MEMORY CONTROLLER AND A MEMORY MODULE AND METHODS THEREOF

PRIORITY STATEMENT

This application claims the benefit of Korean Patent Application No. 2006-43917, filed May 16, 2006 and Provisional U.S. Patent Application No. 60/800,415, filed May 16, 2006, the contents of which are hereby incorporated herein by reference in their entirety.

BACKGROUND OF THE INVENTION

1. Field of the Invention

Example embodiments of the present invention relate generally to a memory module, a memory system including a memory controller and a memory module and methods thereof, and more particularly to a memory module, a memory system including a memory controller and a memory module and methods of performing write and read operations.

2. Description of the Related Art

A conventional memory system may include a memory controller and a memory module. The memory module may receive packet commands and may include a plurality of memories. Each of the plurality of memories may receive a packet command having a command, an address, and write data to perform a write operation, and may receive a packet command having a command and an address to perform a read operation.

FIG. 1 is a block diagram illustrating a configuration of a conventional memory system. Referring to FIG. 1, the memory system may include a memory controller 10 and a memory module 20. The memory module 20 may include n memory units MG1 to MGn, and each of the memory units MG1 to MGn may include a first memory M1 and a second memory M2. The first memory M1 of each of the memory units MG1 to MGn may include a repeater R1, and the second memory of each of the memory units MG1 to MGn may include a repeater R2.

Referring to FIG. 1, c/a/wd1 and c/a/wd2 may denote control signal lines, and rd1 and rd2 may denote read data lines.

A data transmission process performed within the conventional memory system shown of FIG. 1 will now be described in greater detail.

Referring to FIG. 1, the memory controller 10 may apply packet commands to the memory module 20 through the control signal lines c/a/wd1, the first memory M1 may receive the packet command and may transfer the packet command to the second memory M2 through the repeater R1 and the control signal lines c/a/wd2.

Referring to FIG. 1, the first memory M1 may analyze the packet command. If the packet command is a write command to the first memory M1, the first memory M1 may store write data contained in the packet command, and if the packet command is a read command from the first memory M1, the first memory M1 may analyze the packet command and may perform a read operation to transmit read data to the read data lines rd1.

Referring to FIG. 1, the second memory M2 may analyze the packet command applied through the control signal lines c/a/wd2. If the packet command is a write command to the second memory M2, the second memory M2 may store write data contained in the packet command, if the packet command is a read command from the first memory M1, the second memory M2 may transmit read data applied through the read data lines rd1 to the read data lines rd2 through the repeater R2; and if the packet command is a read command from the second memory M2, the second memory M2 may perform a read operation to transmit read data through the read data lines rd2.

Referring to FIG. 1, each of the first and second memories M1 and M2 of the memory system shown in FIG. 1 may include both a repeater and a packet command decoder (not shown) for analyzing the packet command. In addition, the first and second memories M1 and M2 of the memory system shown in FIG. 1 may be directly connected to the memory controller 10 to perform operations, such that operating speeds of the first and second memories M1 and M2 may generally increase as a frequency of a system clock signal increases, which in turn may cause each of the first and second memories M1 and M2 of the memory system shown in FIG. 1 to have an additional configuration for interfacing with the memory controller 10.

FIG. 2 is a block diagram illustrating another configuration of a conventional memory system. Referring to FIG. 2, the memory system may include a memory controller 10 and a memory module 20'. The memory module 20' may include a buffer 20-1 and n memories M1 to Mn. n/2 memories M1 to M(n/2) may be disposed at a first side of the buffer 20-1, and the remainder of the n/2 memories M(n/2+1) to Mn may be disposed at a second side of the buffer 20-1.

Referring to FIG. 2, c/a/wd1 may denote control signal lines, rd may denote read data lines, c may denote command signal lines, a may denote address signal lines, and w/r1 to w/rn may denote write/read data lines.

Referring to FIG. 2, the memory controller 10 may apply a packet command having a command, write data, and an address, or alternatively a packet command having a command and an address, through the control signal lines c/a/wd1. The memory controller 10 may receive read data through the control signal lines rd. The buffer 20-1 may receive and decode the packet command to transmit the command, the address, and the write data to each of the memories M1 to Mn, and may receive the read data transmitted from each of the memories M1 to Mn for transfer to the memory controller 10. If the buffer 20-1 transceives the write/read data with each of the memories M1 to Mn, the buffer 20-1 may transceive data with a given time difference so as to reduce data skews from occurring due to lengths of the write/read data lines w/r1 to w/rn. Also, the buffer 20-1 may process and then transmit and receive a signal so as to comply with a signal transmission speed if the signal transmission speed between the memory controller 10 and the buffer 20-1 is different from that between the memories M1 to Mn and the buffer 20-1.

Accordingly, in the conventional memory module shown in FIG. 2, a given buffer 20-1 may be configured to perform interfacing between the memory controller 10 and the each of the n memories M1 to Mn, which may increase the complexity of the given buffer 20-1, which may likewise increase the complexity of the conventional memory system of FIG. 2.

SUMMARY OF THE INVENTION

An example embodiment of the present invention is directed to a memory module, including a plurality of memory units, each of the plurality of memory units including an interface receiving a packet command to generate a command signal and an address, extracting write data from the received packet command and transferring the extracted write data to memory during a write operation and receiving read data during a read operation and at least one memory device receiving the extracted write data during the write operation, and configured to output the read data during the read operation.

Another example embodiment of the present invention is directed to a method of performing a write operation, including receiving a packet command at a given one of a plurality of memory units, each of the plurality of memory units including an interface and at least one memory device, extracting a command signal, an address and write data from the received packet command if the received packet command corresponds to a write operation, transferring the extracted write data to at least one memory device via write/read data lines internal to the given one memory unit and writing the transferred write data at the at least one memory device.

Another example embodiment of the present invention is directed to a method of performing a read operation, including receiving a packet command at a given one of a plurality of memory units, each of the plurality of memory units including an interface and at least one memory device, extracting a command signal and an address from the received packet command if the received packet command corresponds to a read operation, transferring the extracted command signal and address to at least one memory device, receiving read data corresponding to the extracted command signal and address from the at least one memory device via write/read data lines internal to the given one memory unit and transmitting the received read data from the interface via read data lines external to the given one memory unit.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention.

FIG. 5 is a diagram illustrating a format of a packet command of the memory system of FIG. 3 according to another example embodiment of the present invention.

FIGS. 6A and 6B are operational timing diagrams respectively illustrating write and read operations of an interface of the memory system of FIG. 3 according to example embodiments of the present invention.

FIGS. 9A and 9B are operational timing diagrams illustrating respective write and read operations of an interface of the memory system of FIG. 7 according to another example embodiment of the present invention.

DETAILED DESCRIPTION OF EXAMPLE EMBODIMENTS

Figure 1:
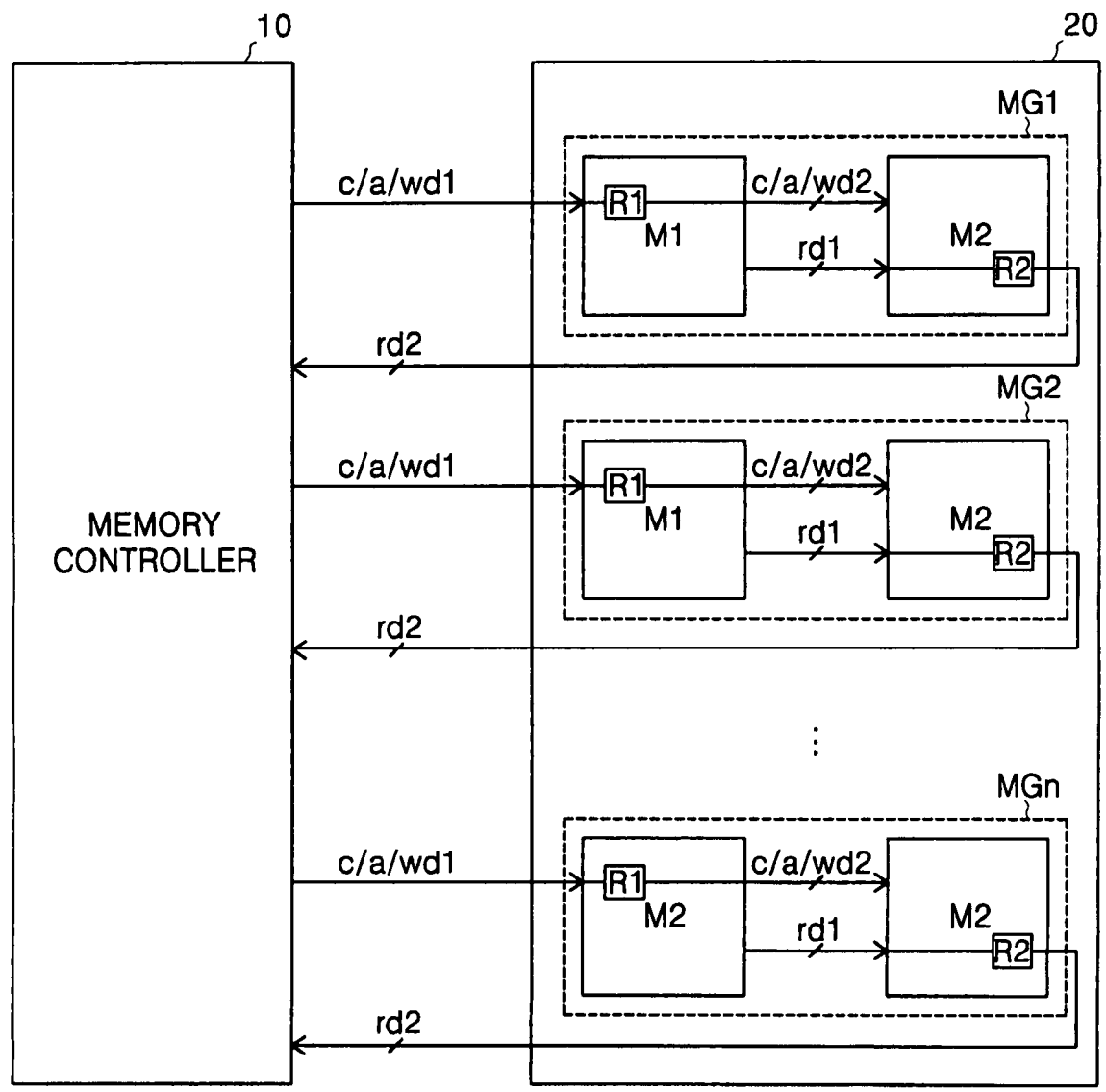
FIG. 1 is a block diagram illustrating a configuration of a conventional memory system.

Detailed illustrative example embodiments of the present invention are disclosed herein. However, specific structural and functional details disclosed herein are merely representative for purposes of describing example embodiments of the present invention. Example embodiments of the present invention may, however, be embodied in many alternate forms and should not be construed as limited to the embodiments set forth herein.

Accordingly, while example embodiments of the invention are susceptible to various modifications and alternative forms, specific embodiments thereof are shown by way of example in the drawings and will herein be described in detail. It should be understood, however, that there is no intent to limit example embodiments of the invention to the particular forms disclosed, but conversely, example embodiments of the invention are to cover all modifications, equivalents, and alternatives falling within the spirit and scope of the invention. Like numbers may refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. Conversely, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 3:
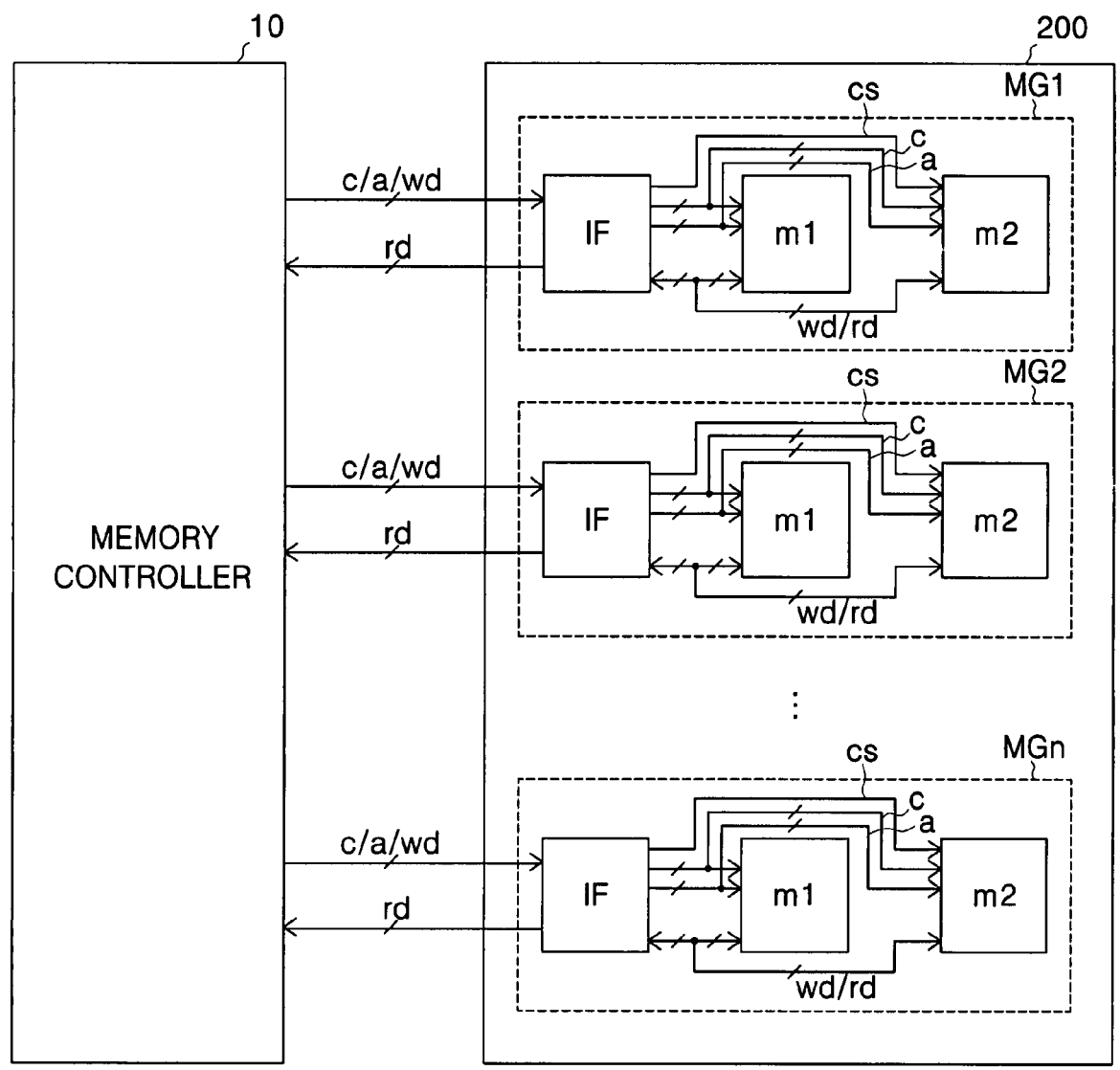
FIG. 3 is a block diagram illustrating a configuration of a memory system including a memory controller and a memory module in accordance with an example embodiment of the present invention.

FIG. 3 is a block diagram illustrating a configuration of a memory system including a memory controller 10 and a memory module 200 in accordance with an example embodiment of the present invention.

In the example embodiment of FIG. 3, the memory controller 10 may be configured structurally similar to that of the memory controller 10 described above with respect to conventional FIGS. 1 and/or 2. The memory module 200 may include n memory units MG1 to MGn (e.g., where n may correspond to an integer greater than or equal to 1). Each of the n memory units MG1 to MGn may include an interface IF, a first memory m1 and a second memory m2.

In the example embodiment of FIG. 3, c/a/wd may denote control signal lines, rd may denote read data lines, cs may denote a chip selection signal line, c may denote command signal lines, a may denote address signal lines, and wd/rd may denote write/read data lines.

In the example embodiment of FIG. 3, each interface IF may receive and analyze a packet command applied through the control signal lines c/a/wd. In an example, each interface IF may be configured to transmit a selection signal through the chip selection signal line cs, a command signal through the command signal lines c, an address through the address signal lines a, and write data through the write/read data lines wd/rd, and may receive read data through the write/read data lines wd/rd for transfer through the read data lines rd. The first memory m1 of a respective interface IF may be enabled in response to the chip selection signal, may store the write data transmitted through the write/read data lines wd/rd in memory cells corresponding to the address if the command signal is a write command, and may transmit the read data stored in the memory cells corresponding to the address through the write/read data lines wd/rd if the command signal is a read command. The second memory m2 may be enabled in response to the chip selection signal, may store the write data transmitted through the write/read data lines wd/rd in memory cells corresponding to the address if the command signal is a write command, and may transmit the read data stored in the memory cells corresponding to the address through the write/read data lines wd/rd if the command signal is a read command.

Figure 2:
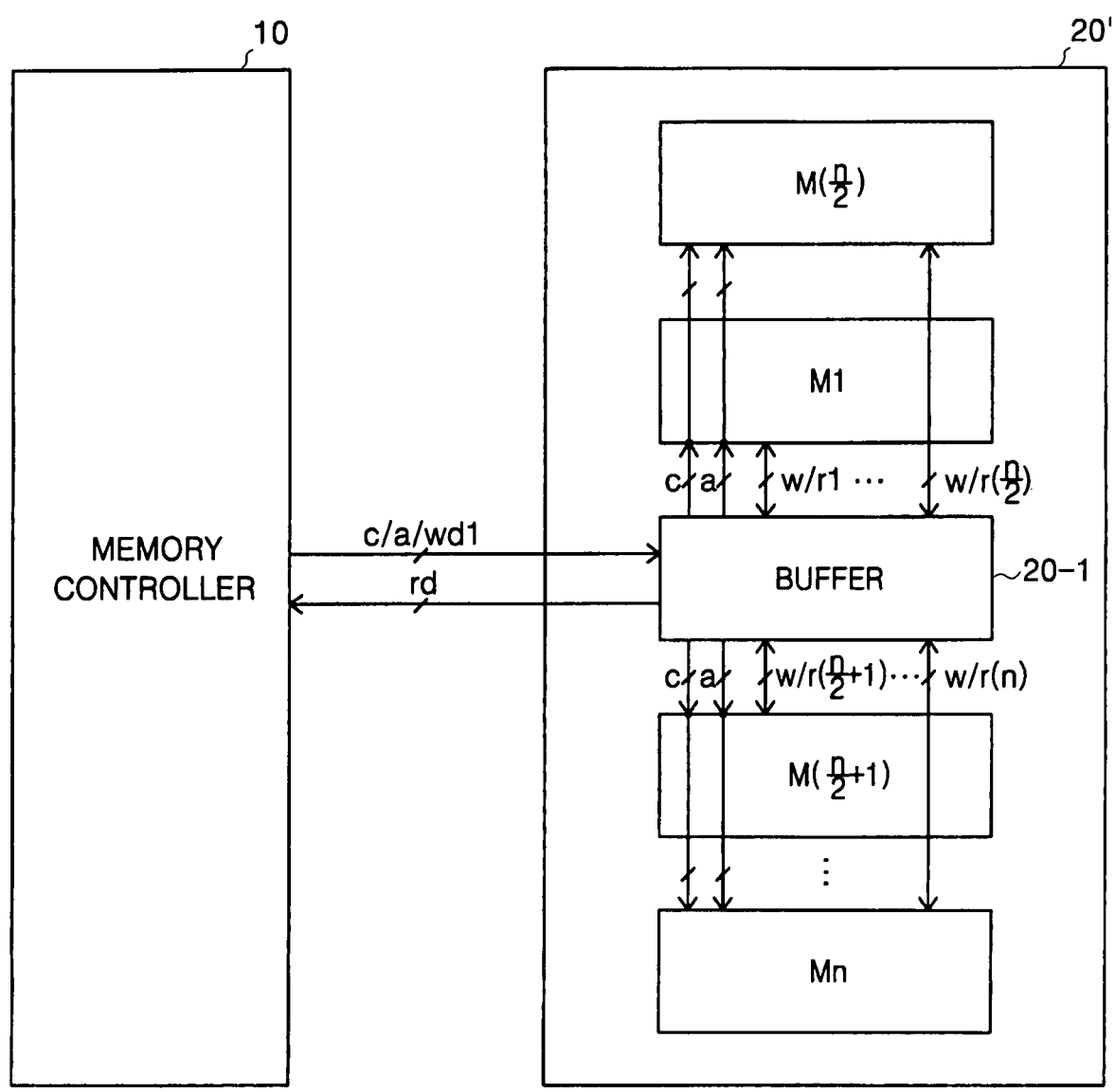
FIG. 2 is a block diagram illustrating another configuration of a conventional memory system.

Referring again to the conventional memory system of FIG. 2, the conventional memory system of FIG. 2 may include a first memory m1 and the second memory m2 sharing the write/read data lines wd/rd, such that the first memory m1 and the second memory m2 may be configured to have a different write latency and a different read latency from each other so as to reduce an occurrence of data collision in the data lines wd/rd during write and read operations. For example, in the conventional memory system of FIG. 2, if a burst length of each of the first memory m1 and the second memory m2 is set to 4 and a period of a clock signal corresponding to the burst length is 2 cycles, the write latency of the second memory m2 may be set to 4 when the write latency of the first memory m1 may be set to 2. In another example, the read latency of the second memory m2 may be set to 8 if the read latency of the first memory m1 is set to 6. The write latency may refer to a period of a clock signal between a write command being applied to the first memory m1 and/or the second memory m2 until write data is applied to the first memory m1 and/or the second memory m2 following. The read latency may refer to a period of a clock signal between a read command being applied to the first memory m1 and/or the second memory m2 until read data is output from the first memory m1 and/or the second memory m2 after. If the burst length is 8, the period of the clock signal corresponding to the burst length may become 8 if the first memory m1 and the second memory m2 operate at a single data rate, and alternatively may become 4 if the first and second memories m1 and m2 operate at a double data rate.

Returning to the example embodiment of FIG. 3, the interface IF need not be disposed for each of the memories m1 and m2, and rather need only be disposed in each of the n memory units MG1 to MGn, respectively, such that the function of the interface IF allow a configuration of the interface IF to be simplified compared to the conventional art.

Figure 4:
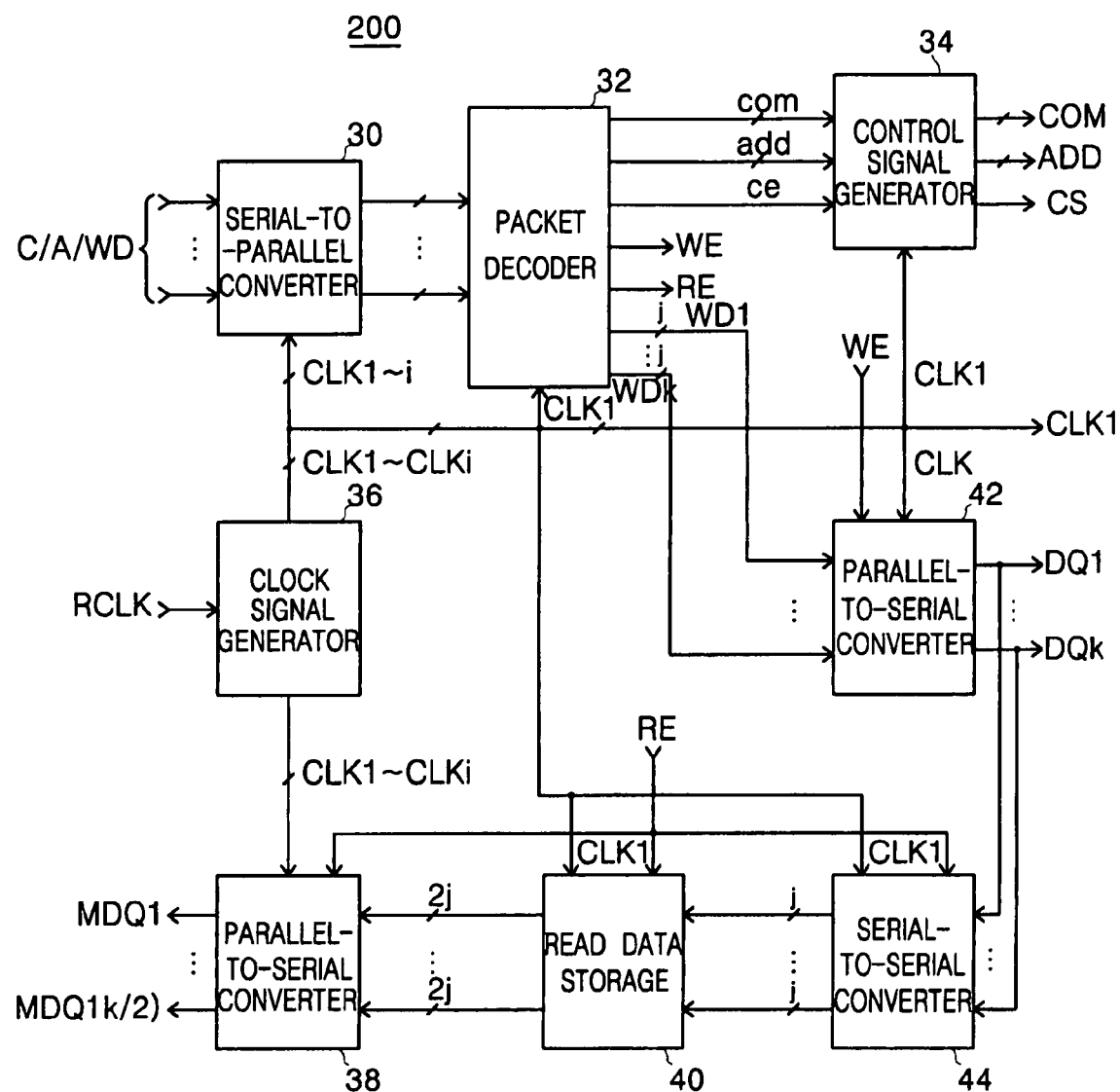
FIG. 4 is a block diagram illustrating the memory module of FIG. 3 according to another example embodiment of the present invention.

FIG. 4 is a block diagram illustrating the memory module 200 of FIG. 3 according to another example embodiment of the present invention. In the example embodiment of FIG. 3, the memory module 200 may include serial-to-parallel converters 30 and 44, a packet decoder 32, a control signal generator 34, a clock signal generator 36, parallel-to-serial converters 38 and 42, and a read data storage 40.

In the example embodiment of FIG. 4, the clock signal generator 36 may receive a reference clock signal RCLK to generate i clock signals CLK1 to CLKi having the same frequency but different phase differences. A given clock signal CLK1 of the i clock signals CLK1 to CLKi may be generated in synchronization with the reference clock signal RCLK. The reference clock signal RCLK may be applied from the memory controller 10 or an external separate clock generator (not shown). The serial-to-parallel converter 30 may convert packet commands serially applied through control signal terminals (not shown) to parallel packet commands in response to the i clock signals CLK1 to CLKi, thereby generating respective parallel control signals. The packet decoder 32, in response to one clock signal CLK1 of the clock signals CLK1 to CLKi, may analyze the parallel control signal to generate a command signal corm, an address signal add, a chip selection signal ce and parallel data WD1 to WDk. Alternatively, the packet decoder 32, in response to one clock signal CLK1 among the clock signals CLK1 to CLKi, may analyze the parallel control signal to generate a command signal com, an address signal add and a chip selection signal ce. The packet decoder 32 may also decode the command signal com to generate a write command WE and a read command RE. The packet decoder 32 may output (e.g., continuously) two groups of parallel data WD1 to WDk in response to the clock signal CLK1 during a write operation, wherein the first group of parallel data WD1 to WDk may be output to be stored in the first memory m1 and/or second memory m2.

In the example embodiment of FIG. 4, the second group of parallel data WD1 to WDk may be output to be stored in the second memory m2 and/or the first memory m1 after being delayed by a given delay period of the clock signal corresponding to the burst length j, such that the first group of parallel data WD1 to WDk and the second group of parallel data WD1 to WDk may be output (e.g., continuously). Each of the parallel data WD1 to WDk may include parallel data of j bits corresponding to the burst length j. The control signal generator 34 may output the command signal com as a command signal COM, the address signal add as an address signal ADD, and the chip selection signal ce as a chip selection signal CS in response to the clock signal CLK1. The parallel-to-serial converter 42, in response to the write command WE and rising and falling edges of the clock signal CLK1, may convert the first group of parallel data WD1 to WDk to serial write data DQ1 to DQk by j bits and may transmit the converted bits to the write/read data lines wd/rd through k data input and output terminals (not shown).

In the example embodiment of FIG. 4, the first group of write data DQ1 to DQk output from the parallel-to-serial converter 42 may be transmitted to the first memory m1, and the second group of write data DQ1 to DQk output from the parallel-to-serial converter 42 may be transmitted to the second memory m2. The serial-to-parallel converter 44 may convert each of two groups of read data DQ1 to DQk (e.g., which may be serially and continuously applied in response to the read command RE and the clock signal CLK1) to parallel data. Each of the first and second groups of k read data DQ1 to DQk may be serial data of j bits, and each of the k parallel data output from the serial-to-parallel converter 44 may include j bits.

In the example embodiment of FIG. 4, the read data storage 40 may store (e.g., continuously) and output the first and second groups of parallel read data output from the serial-to-parallel converter 44 in response to the read command RE and the clock signal CLK1. In an example, each of k/2 parallel read data output from the read data storage 40 may include 2j bits, and data of 2j bits may be output (e.g., continuously). The parallel-to-serial converter 34, in response to the read command RD and i clock signals CLK1 to CLKi, may convert the first and second groups of parallel read data output from the read data storage 40 to serial data by 2j bits, and may transmit the converted bits to the read data lines rd through k/2 data output terminals (not shown). In an example, each of the k/2 read data MDQ1 to MDQk/2 output from the parallel-to-serial converter 34 may be serial data of 4j bits.

FIG. 5 is a diagram illustrating a format of a packet command of the memory system of FIG. 3 according to another example embodiment of the present invention.

In the example embodiment of FIG. 5, row A may denote an active command format, which may include a chip selection signal CS, a command signal COM, and a row address RADD. The command signal COM may include an inversion chip selection signal, an inversion write enable signal, an inversion column address strobe signal and an inversion row address strobe signal. In an example, the command signal may include data of 4 bits in this case. The row address signal may be a signal for selecting a word line of a memory cell array of the first or second memory, and the row address signal may be applied along with a bank address signal if the memory cell array includes a plurality of banks.

In the example embodiment of FIG. 5, a row B may denote a write command format, which may include three-packet data. A first packet data of the three-packet data may include a chip selection signal CS, a command signal COM and a column address signal CADD, and the second and third packet data of the three-packet data may include a first group of write data to be stored in the first memory m1 and a second group of write data to be stored in the second memory m2, respectively.

In the example embodiment of FIG. 5, a row C may denote a read command format, which may include a single packet data, as may correspond to the active command format, and the single packet data may include a chip selection signal CS, a command signal COM and a column address signal CADD.

In the example embodiment of FIG. 5, write data may be written to the memory cell connected between the selected bit line and the selected word line of the memory cell array if the write command format of row B is applied, and data stored in the memory cell connected between the selected bit line and the selected word line of the memory cell array is read if the read command format of row C is applied.

Figure 6A:
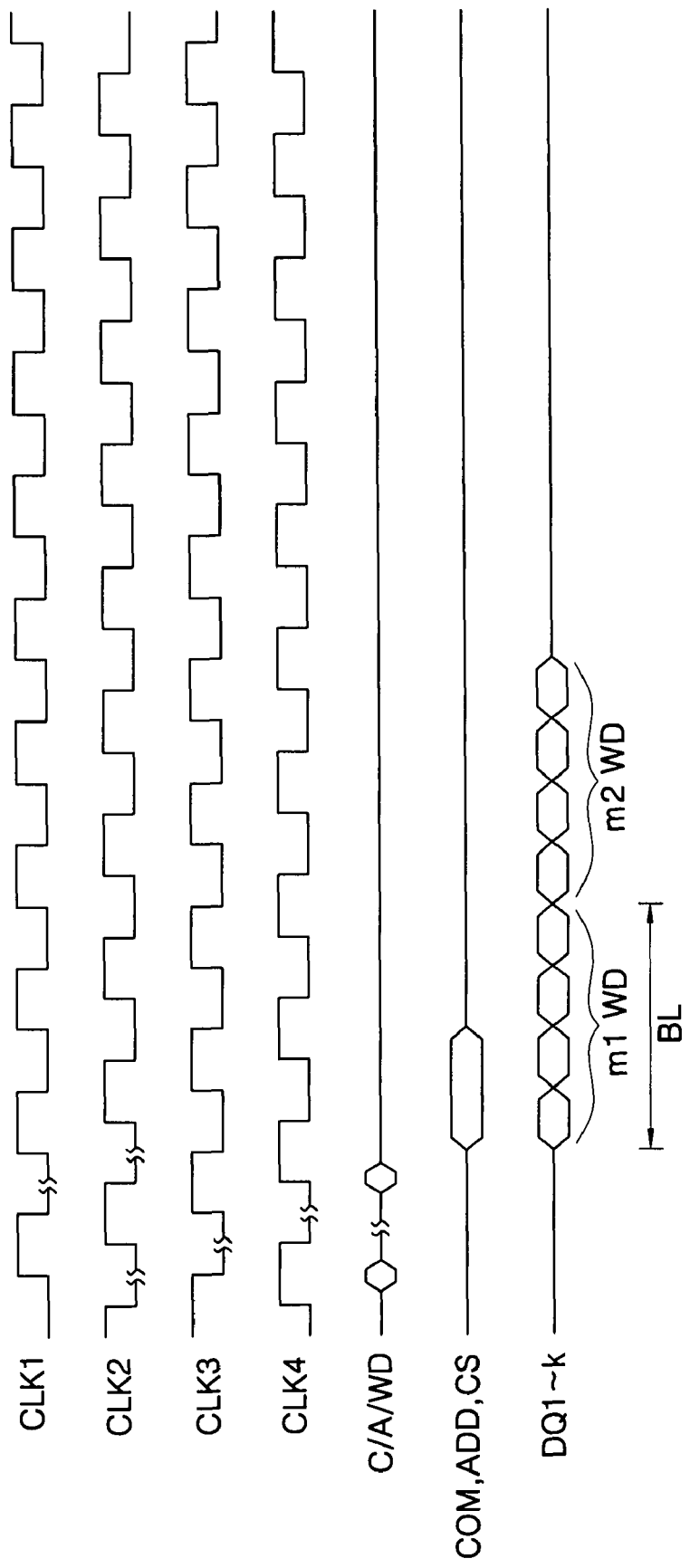

FIGS. 6A and 6B are operational timing diagrams respectively illustrating write and read operations of an interface of the memory system of FIG. 3 according to example embodiments of the present invention. In the example embodiment of FIGS. 6A and 6B, the first memory m1 and the second memory m2 may be input and/or output data at a double data rate, the write latency may be 0, the read latency may be 3 and the period of the clock signal corresponding to the burst length may be 2 in the first memory m1, the write latency may be 2 and the read latency may be 5 in the second memory m2 (e.g., in terms of clock cycles).

In the example embodiment of FIG. 6A, if the packet command of format B (e.g., row B of FIG. 5) is applied, the interface IF may receive and analyze the packet command B, in response to four clock signals CLK1 to CLK4 having the same frequency and respective phase differences of 90°, to output a chip selection signal CS, a command signal COM, a column address CADD, a first write data m1 WD and a second write data m2 WD in response to the clock signal CLK1. The second write data m2 WD may be output after an output of the command signal COM and a delay by a given delay period (e.g., 2 clock signals) corresponding to the burst length.

In the example embodiment of FIG. 6B, if the packet command C (e.g., row C of FIG. 5) is applied, the interface IF may receive the packet command C to output a chip selection signal CS, a command signal COM and a column address CADD in response to the clock signal CLK1. The first memory m1 may output a first group of read data m1 RD after a given delay period (e.g., 5 clock periods) corresponding to the read latency in response to the command signal COM, and the second memory m2 outputs a second group of read data m2 RD after a given delay period (e.g., 7 clock periods) corresponding to the read latency in response to the command signal COM. In an example, the interface IF may convert a first group of serial read data m1 RD by 4 bits and a second group of serial read data m2 RD by 4 bits, which may be serially applied through k data input and output terminals (not shown) to parallel data, thereby outputting (e.g., continuously) a first group of serial read data m1 RD' by 8 bits and a second group of serial read data m2 RD' by 8 bits through k/2 data output terminals (not shown) in response to the clock signals CLK1 to CLK4.

In the example embodiment of FIGS. 3 through 6B, if the interface shown in the example embodiment of FIG. 4 transmits data at an operating frequency of 3.2 GHz while transmitting and receiving data with the memory controller 10, and the interface of FIG. 4 transmits data at an operating frequency of 800 MHz while transmitting and receiving data with the first memory m1 and the second memory m2, and the first and second memories m1 and m2 input and output data at a double data rate, the clock signal generator 36 of the interface may generate four clock signals CLK1 to CLK4 having the same frequency of 800 MHz and having respective phase differences (e.g., of 90°) so as to transmit a clock signal CLK1 of 800 MHz synchronized with the reference clock signal RCLK to the first memory m1 and the second memory m2.

In the example embodiment of FIGS. 3 through 6, as can be seen from the timing diagram of FIG. 6A, data transmitted from the memory controller 10 may be adjusted or transitioned from a higher speed to a lower speed to transfer the data to the first memory m1 and the second memory m2. In an alternative example, data transmitted from the first memory m1 and the second memory m2 within the example interface of FIG. 4 may be transitioned or adjusted from a lower speed to a higher speed to transfer the data to the memory controller 10.

Figure 7:
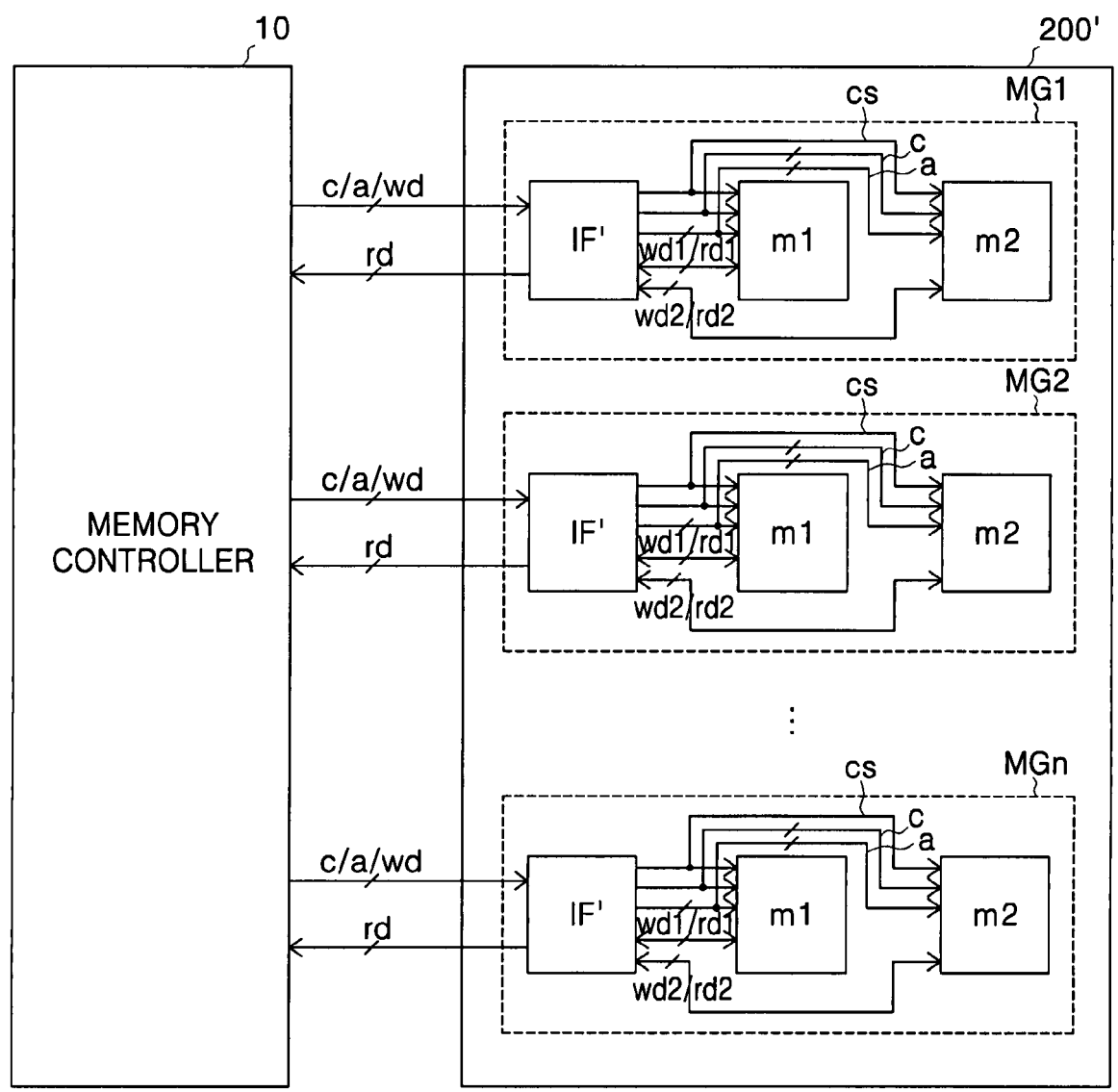
FIG. 7 is a block diagram illustrating a memory system including the memory controller and another memory module in accordance with another example embodiment of the present invention.

FIG. 7 is a block diagram illustrating a memory system including the memory controller 10 and a memory module 200' in accordance with another example embodiment of the present invention.

In the example embodiment of FIG. 7, the memory module 200' may include first write/read data lines wd1/rd1 between the interface IF and the first memory m1 and second write/read data lines wd2/rd2 between the interface IF and the second memory m2, which may differ from the memory module 200 of FIG. 3 where the write/read data lines wd/rd are connected between the interface IF and the first memory m1 and between the interface IF and the second memory m2.

In the example embodiment of FIG. 7, the interface IF may receive a packet command applied through the control signal lines c/a/wd, and may analyze the packet command to transmit a chip selection signal to the chip selection signal line cs, a command signal to the command signal lines c, an address to the address signal lines a, a first group of write data to the first write/read data lines wd1/rd1, and a second group of write data to the second write/read data lines wd2/rd2. The interface IF may also receive read data transmitted through the first write/read data lines wd1/rd1 and the second write/read data lines wd2/rd2 to transmit the read data to the read data lines rd. The first memory m1 may be enabled in response to the chip selection signal to store the first group of write data transmitted through the first write/read data lines wd1/rd1 in memory cells corresponding to the address if the command signal is a write command and to transmit the first group of read data stored in memory cells corresponding to the address to the first write/read data lines wd1/rd1 if the command signal is a read command. The second memory m2 may be enabled in response to the chip selection signal to store the second group of write data transmitted through the second write/read data lines wd2/rd2 in memory cells corresponding to the address if the command signal is a write command and to transmit the second group of read data stored in memory cells corresponding to the address to the second write/read data lines wd2/rd2 if the command signal is a read command.

In the example embodiment of FIG. 7, in an example, the first write/read data lines wd1/rd1 and the second write/read data lines wd2/rd2 may be separated from each other, so that the first memory m1 and the second memory m2 may be configured to have the same write latency, the same read latency, and the same burst length.

In the example embodiment of FIG. 7, the interface IF need not be disposed within each of the memories m1 and m2. Rather, in an example, the interface IF need only be disposed in each of the n groups of memory units MG1 to MGn, respectively, such that the function of the interface IF may allow a configuration of the interface IF to be simplified compared to the conventional art.

Figure 8:
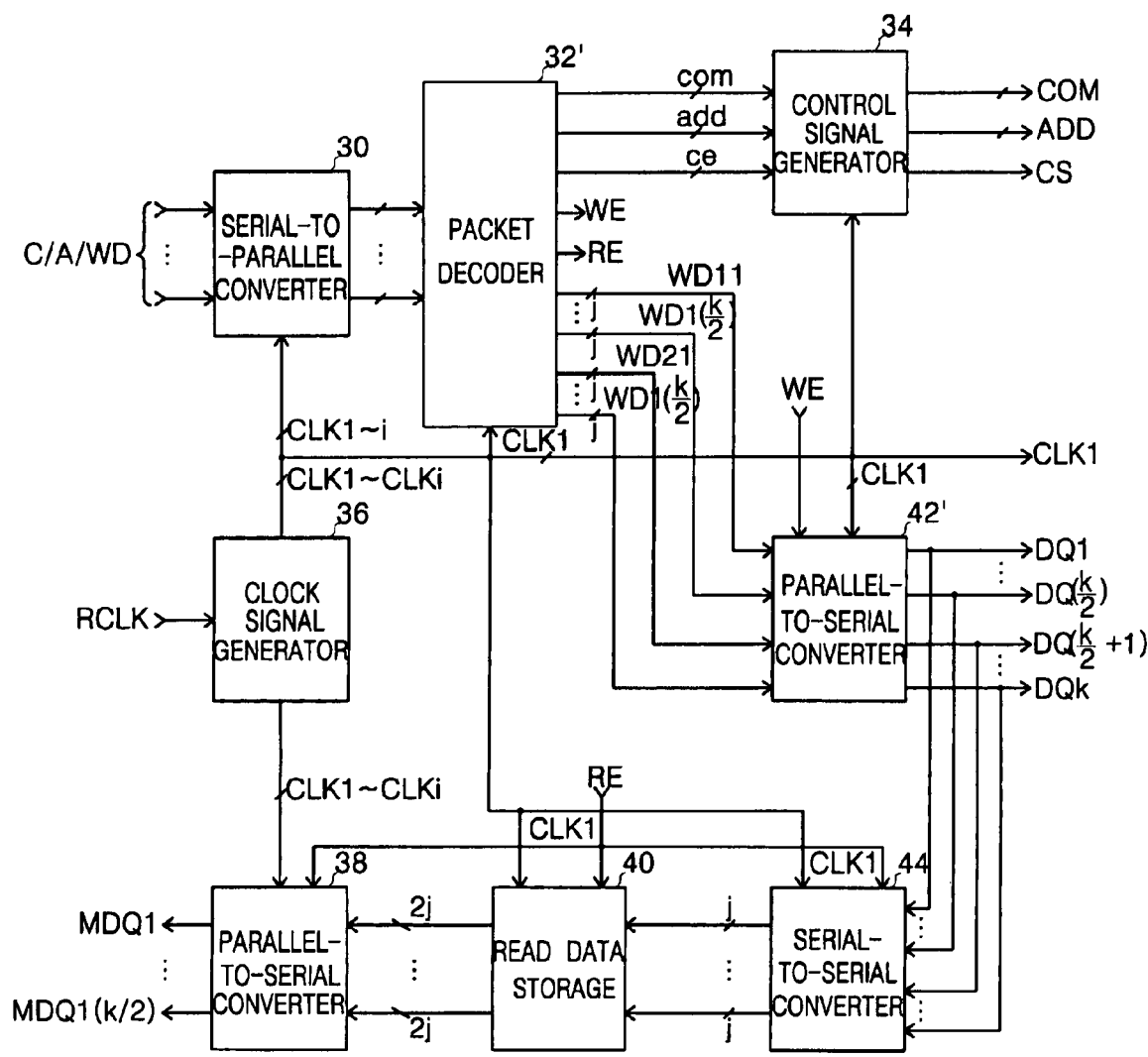
FIG. 8 is a block diagram of the memory module of FIG. 7 according to another example embodiment of the present invention.

FIG. 8 is a block diagram of the memory module 200' of FIG. 7 according to another example embodiment of the present invention. The memory module 200' of FIG. 7 may differ from the memory module 200 of FIG. 4 in that the packet decoder 32 of FIG. 4 may be replaced by a packet decoder 32' and the parallel-to-serial converter 42 of FIG. 4 may be replaced by a parallel-to-serial converter 42'. Elements within FIG. 8 having the same reference numerals as the example embodiment of FIG. 4 may function similar to their corresponding elements, and as such a further description thereof has been omitted for the sake of brevity.

In the example embodiment of FIG. 8, the packet decoder 32' may receive a parallel control signal in response to one clock signal CLK1 of clock signals CLK1 to CLKi to generate a command signal corm, an address signal add, a chip selection signal ce, a first group of parallel data WD11 to WD1(k/2) and a second group of parallel data WD21 to WD2(k/2). Alternatively, the packet decoder 32' may receive a parallel control signal in response to one clock signal CLK1 of clock signals CLK1 to CLKi to generate a command signal corm, an address signal add and a chip selection signal ce, and decodes the command signal com to generate a write command WE and a read command RE. In an example, each of the parallel data WD11 to WD1(k/2) in the first group and each of the parallel data WD21 to WD2(k/2) in the second group may include j bits corresponding to the burst length j. The parallel-to-serial converter 42', in response to the write command WE and the clock signal CLK1, may convert each of the first group of parallel data WD11 to WD1(k/2) to serial data to thereby transmit each of the first group of write data DQ1 to DQ(k/2) to the first write/read data lines wd1/rd1 through k/2 data input and output terminals (not shown), and may convert each of the second group of parallel data WD21 to WD2(k/2) to serial data to thereby transmit each of the second group of write data DQ(k/2+1) to DQk to the second write/read data lines wd2/rd2 through k/2 data input and output terminals (not shown). In another example, each of the first and second groups of write data DQ1 to DQk output from the parallel-to-serial converter 42' may be serial data of j bits.

In the example embodiment of FIGS. 7 and 8, the number of data input and output terminals (e.g., pins or balls) in the memory module 200' may be reduced (e.g., by half) as compared to the number of data input and output terminals of the memory module 200 of FIG. 3. In addition, the first memory m1 and the second memory m2 shown in FIG. 3 may include write and read latencies set so as to input and output write data and read data with a time difference by the clock period corresponding to the burst length, while the first memory m1 and the second memory m2 may have write and read latencies set so as to concurrently (e.g., simultaneously) input and output write data and read data.

In an example, the format of the packet command of the memory system shown in FIG. 7 may have the same configuration options as the packet command formats (e.g., rows A, B and/or C) as illustrated in the example embodiment of FIG. 5.

FIGS. 9A and 9B are operational timing diagrams illustrating respective write and read operations of an interface of the memory system of FIG. 7 according to another example embodiment of the present invention. For example, the example embodiments of FIGS. 9A and 9B may illustrate a case where data may be set to input/output to/from the first memory m1 and the second memory m2 at a double data rate, write latencies may be set to 0, read latencies may be set to 3, burst lengths may be set to 8, and a clock period corresponding to the burst length may be set to 4 in the first memory m1 and the second memory m2 (e.g., with the numerical delay or latency values given in terms of clock cycles or periods).

In the example embodiment of FIG. 9A, the interface IF may receive and decode the packet command B in response to four clock signals CLK1 to CLK4 of the packet command B (e.g., formatted as shown in row B of FIG. 5) is applied. The interface IF may concurrently (e.g., simultaneously) output a chip selection signal CS, a command signal COM, a column address CADD, a first group of serial write data m1 WD by 8 bits, and a second group of serial write data m2 WD by 8 bits in response to the clock signal CLK1.

In the example embodiment of FIG. 9B, if the packet command C (e.g., formatted as shown in row C of FIG. 5) is applied, the interface IF may receive and analyze the packet command C to output a chip selection signal CS, a command signal COM and a column address CADD in response to the clock signal CLK1. The first memory m1 and the second memory m2, in response to the command signal COM, may be delayed (e.g., by 5 clock periods) corresponding to the read latency and may then output a first group of serial read data m1 RD by j bits and a second group of serial read data m2 RD by j bits. The interface IF may convert the first group of read data m1 RD including 4 bits and the second group of read data m2 RD including 4 bits which are serially applied through respective k/2 data input and output terminals (not shown) to parallel data, thereby serially outputting a first group of read data m1 RD' by 8 bits and a second group of read data m2 RD' by 8 bits through respective k/2 data output terminals (not shown) in response to the clock signals CLK1 to CLK4.

In the example memory systems of FIGS. 3 and 7, write and read operations may be performed on the first memory m1 and the second memory m2 in common.

Figure 10:
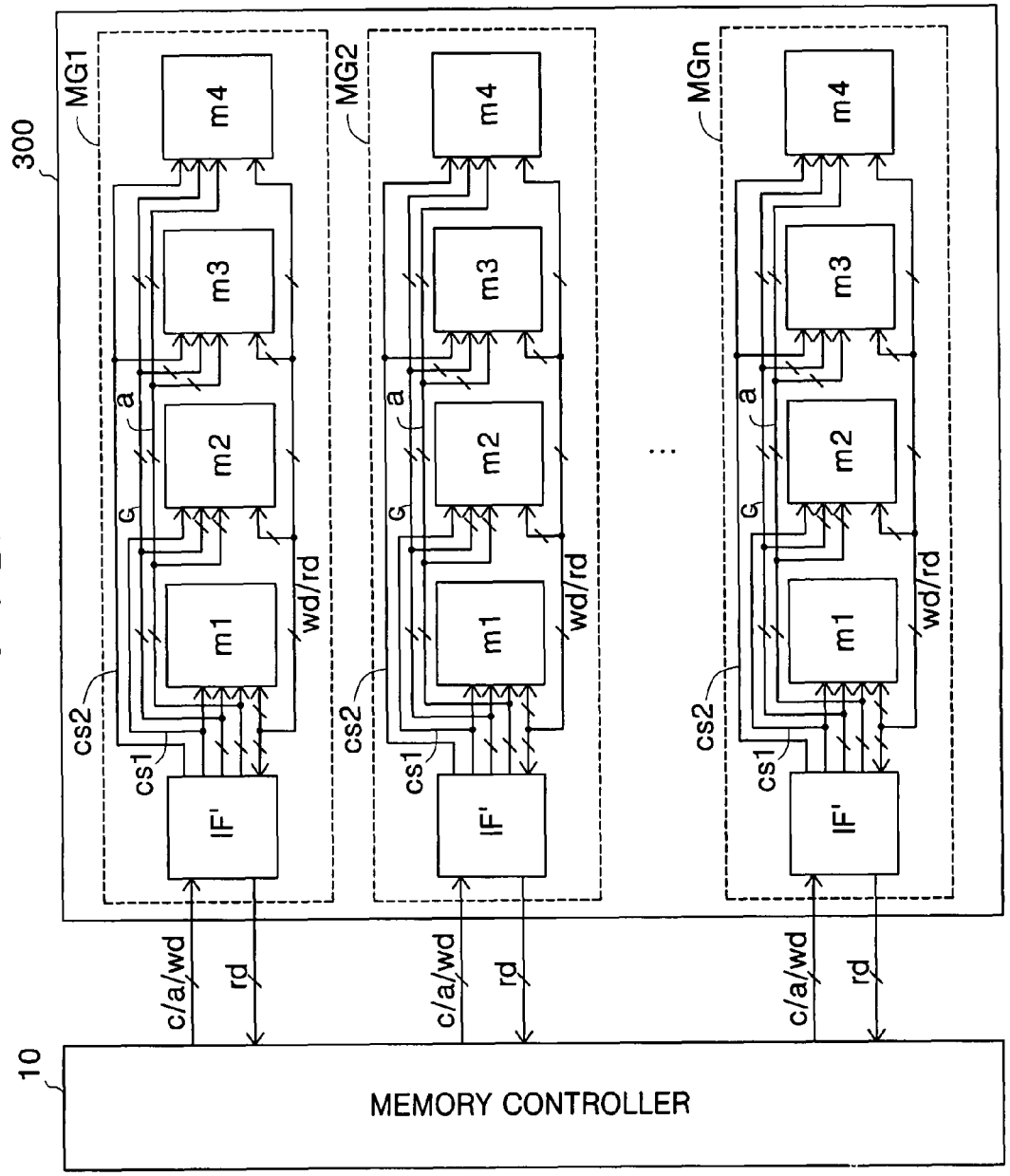
FIG. 10 is a block diagram illustrating a memory system including the memory controller and another memory module in accordance with another example embodiment of the present invention.

FIG. 10 is a block diagram illustrating a memory system including the memory controller 10 and a memory module 300 in accordance with another example embodiment of the present invention.

In the example embodiment of FIG. 10, the memory module 300 may include memories m3 and m4 within each of the respective groups of memory units MG1 to MGn. The interface IF, the first memory m1 and the second memory m2 in each of the groups of memory units MG1 to MGn may be connected to the first chip selection signal line cs1 in common. The interface IF, the third memory m3 and the fourth memory m4 may be connected to the second chip selection signal line cs2 in common. The interface IF and the first to fourth memories m1 to m4 may be connected to the command signal lines c, the address signal lines a, and the write/read data lines wd/rd in common.

In the example embodiment of FIG. 10, the interface IF may receive a packet command applied through the control signal lines c/a/wd, may analyze the packet command to apply the first chip selection signal to the first chip selection signal line cs1, the second chip selection signal to the second chip selection signal line cs2, and the command signal, the address signal and first and second groups of write data (e.g., or third and fourth groups of write data) to the command signal lines c, the address signal lines a, and the write/read data lines wd/rd, respectively. Each of the first memory m1 and the second memory m2 may be enabled in response to the first chip selection signal, may store the first group of write data transmitted through the write/read data lines wd/rd in memory cells corresponding to the address if the command signal is a write command, and may transmit the first group of read data stored in the memory cells corresponding to the address to the write/read data lines wd/rd if the command signal is a read command. The second memory m2 may be enabled in response to the first chip selection signal, may store the second group of write data transmitted through the write/read data lines wd/rd in memory cells corresponding to the address if the command signal is a write command, and may transmit the second group of read data stored in the memory cells corresponding to the address to the write/read data lines wd/rd if the command signal is a read command.

In the example embodiment of FIG. 10, the third memory m3 may be enabled in response to the second chip selection signal, may store the third group of write data transmitted through the write/read data lines wd/rd in memory cells corresponding to the address if the command signal is a write command, and may transmit the third group of read data stored in the memory cells corresponding to the address to the write/read data lines wd/rd if the command signal is a read command. The fourth memory m4 may be enabled in response to the second chip selection signal, may store the fourth group of write data transmitted through the write/read data lines wd/rd in memory cells corresponding to the address if the command signal is a write command, and may transmit the fourth group of read data stored in the memory cells corresponding to the address to the write/read data lines wd/rd if the command signal is a read command.

In the example embodiment of FIG. 10, the first and second memories m1 and m2 may perform write and read operations in common in response to the first chip selection signal, and the third and fourth memories m3 and m4 may perform write and read operations in common in response to the second chip selection signal. That is, the memory system of FIG. 10 may enable data to be written/read to/from two memories of each of the groups of memory units (e.g., concurrently).

In the example embodiment of FIG. 10, in an example, the write and read latencies of the first to fourth memories m1 to m4 of the memory module shown in FIG. 10 may be configured the same as the first and second memories m1 and m2 shown in FIG. 3.

While not shown, the interface IF of the memory module 300 of the example embodiment of FIG. 10 may be configured to be similar to that of the interface shown in FIG. 3, such that the interface IF need only transmit the first and second chip selection signals included in the packet command to generate the first and second chip selection signals from the packet decoder.

Figure 11:
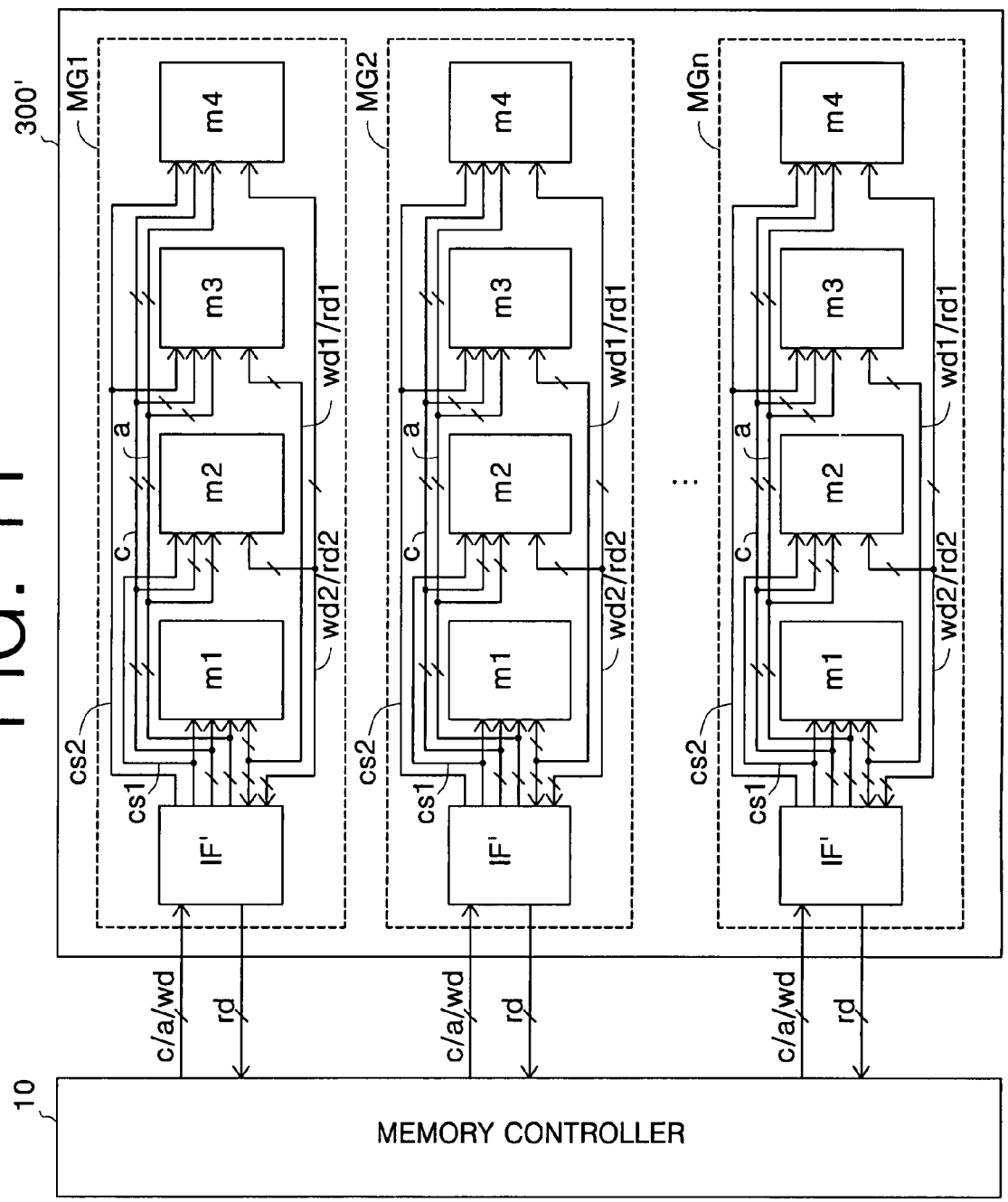
FIG. 11 is a block diagram illustrating a memory system including the memory controller and another memory module in accordance with another example embodiment of the present invention.

FIG. 11 is a block diagram illustrating a memory system including the memory controller 10 and a memory module 300' in accordance with another example embodiment of the present invention.

In the example embodiment of FIG. 11, the memory module 300' may be configured the same as the memory module 300 of FIG. 10 except that the first write/read data lines wd1/rd1 may be connected to the interface IF and the first and second memories m1 and m2 in common and the second write/read data lines wd2/rd2 may be connected to the interface IF and the third and fourth memories m3 and m4 in common.

In the example embodiment of FIG. 11, the first and second memories m1 and m2 may perform write and read operations in common in response to the first chip selection signal, and the third and fourth memories m3 and m4 may perform write and read operations in common in response to the second chip selection signal as in the memory system shown in FIG. 10.

In the example embodiment of FIG. 11, the write and read latencies of the first to four memories m1 to m4 of the memory module shown 300' may be, for example, set to the same values as that of the first and second memories m1 and m2 shown in FIG. 7. Accordingly, the first memory m1 (e.g., the third memory m3) and the second memory m2 (e.g., the fourth memory m4) may concurrently (e.g., simultaneously) store data received from the first write/read data lines wd1/rd1 and the second write/read data lines rd2/wd2 during a write operation, respectively, and the first memory m1 (e.g., the third memory m3) and the second memory m2 (e.g., the fourth memory m4) may concurrently (e.g., simultaneously) output the data to the first write/read data lines wd1/rd1 and the second write/read data lines rd2/wd2 during a read operation, respectively.

While not shown in the example embodiment of FIG. 11, the interface IF may be configured similar that of the interface shown in FIG. 8, such that the interface IF need only transmit the first and second chip selection signals included in the packet command to generate the first and second chip selection signals from the packet decoder.

Figure 12:
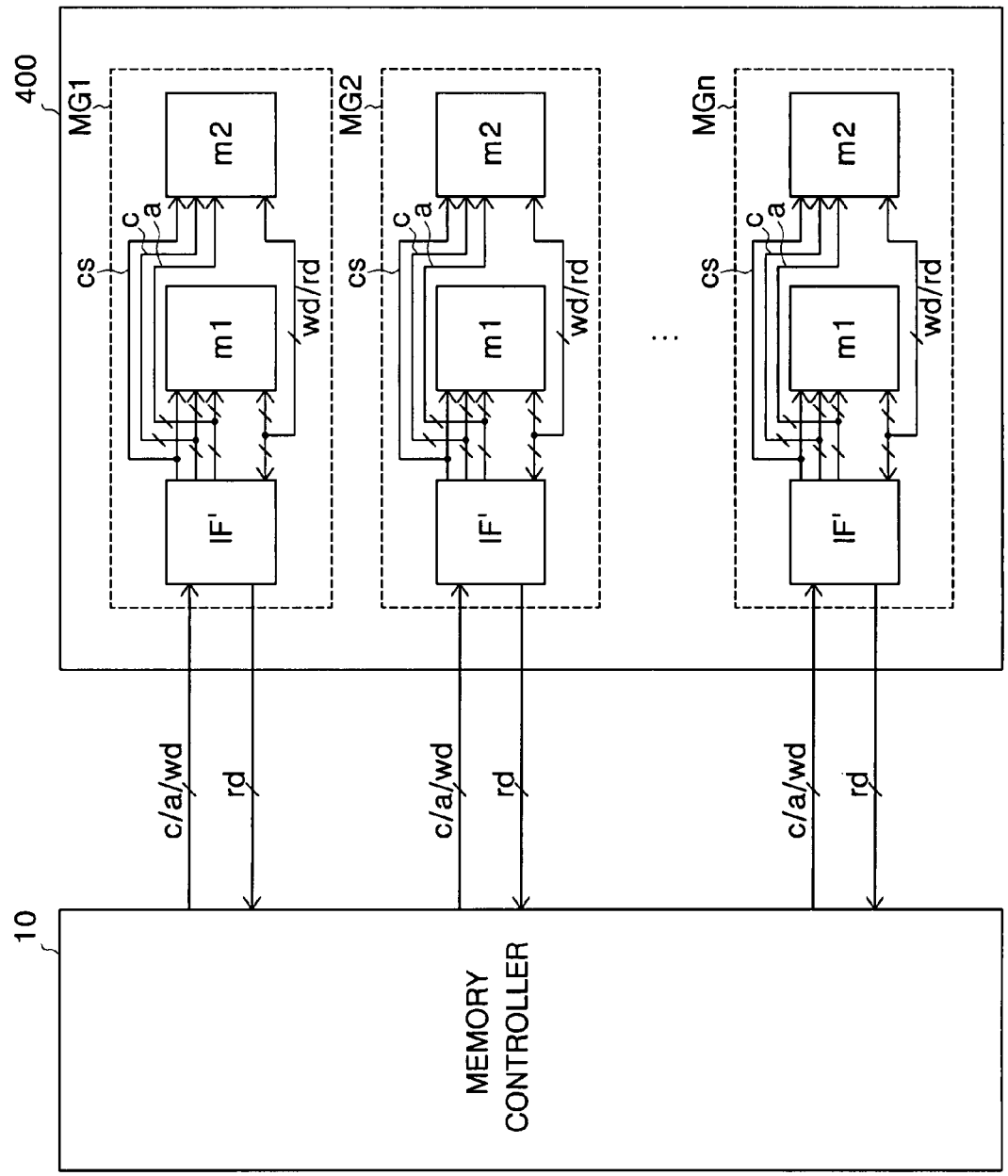
FIG. 12 is a block diagram illustrating a memory system including the memory controller and another memory module in accordance with another example embodiment of the present invention.

FIG. 12 is a block diagram illustrating a memory system including the memory controller 10 and a memory module 400 in accordance with another example embodiment of the present invention. In the example embodiment of FIG. 12, the memory module 400 may be configured in the same manner as the memory module of FIG. 3 except that the interface IF of FIG. 3 may be replaced by an interface IF'.

In the example embodiment of FIG. 12, the interface IF' may perform an interfacing function between the memory controller 10 and the first memory m1 and the second memory m2 and also a function of storing data (e.g., similar to the first and second memories m1 and m2).

In the example embodiment of FIG. 12, the first memory m1 and the second memory m2 may be separately disposed. Alternatively, in another example, the first memory m1 and the second memory m2 may be disposed as a single memory.

Figure 13:
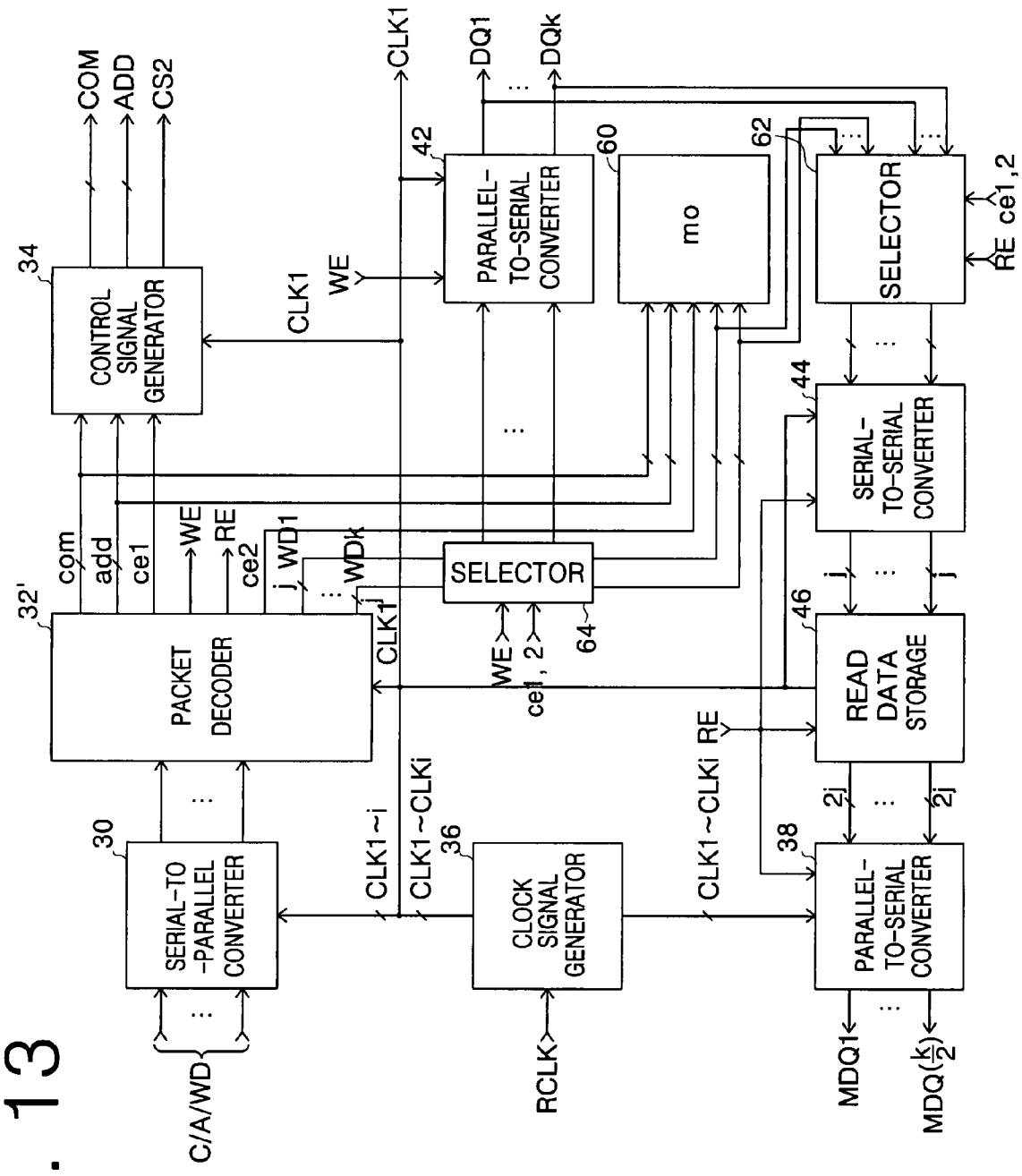
FIG. 13 is a block diagram illustrating an interface within the memory system of FIG. 12 according to another example embodiment of the present invention.

FIG. 13 is a block diagram illustrating the interface IF' of FIG. 12 according to another example embodiment of the present invention. In the example embodiment of FIG. 13, the interface IF' may be similar to the example embodiment of FIG. 4 except that the packet decoder 32 of the interface shown in FIG. 4 may be replaced with a packet decoder 32' and a memory 60 and selectors 62 and 64 may be further included. The remaining common elements in the example embodiments of FIGS. 4 and 12 may be configured in the same or a substantially similar manner, such that a further description thereof has been omitted for the sake of brevity.

in the example embodiment of FIG. 13, the packet decoder 32' may receive a parallel control signal to generate a chip selection signal ce2 in addition to the chip selection signal ce1, in contrast to the packet decoder 32 of FIG. 4. The selector 64 may transmit parallel data WD1 to WDk to the parallel-to-serial converter 42 in response to the write command WE and the chip selection signal ce1, and may transmit the parallel data WD1 to WDk to the memory 60 in response to the write command WE and the chip selection signal ce2. The memory 60 may be enabled in response to the chip selection signal ce2 to perform operations, and may store write data output from the selector 64 during a write operation and may generate read data during a read operation in response to the command signal com and the address add. The selector 62 may select read data applied from k data input and output terminals (not shown) and may output the selected read data to the serial-to-parallel converter 44 in response to the read command RE and the chip selection signal ce1. The selector 62 may further select read data applied from k data input and output terminals (not shown) and may output the selected read data to the serial-to-parallel converter 44 in response to the read command RE and the chip selection signal ce2.

In the example embodiment of FIG. 13, in an example, the memory 60 may have a data storage capacity two times larger than the first memory m1 and the second memory m2. In another example, the interface IF' of the memory module shown in FIG. 12 may include the functionality of each of the memory m0 and the interface IF of FIG. 4.

While not shown in the example embodiment of FIG. 13, the write/read data lines wd/rd of the first memory m1 and the second memory m2 of the memory module shown in FIG. 12 may be separately divided to the first write/read data lines wd1/rd1 and the second write/read data lines wd/rd2 as shown in FIG. 7. Further, FIG. 12 has been described such that the first and second memories m1 and m2 and the memory m0 of the interface IF' of the memory module need not perform write and read operations in common. However, in another example embodiment of the present invention, the memory m0 and the first and second memories m1 and m2 may perform the write and read operations in common.

Figure 14:
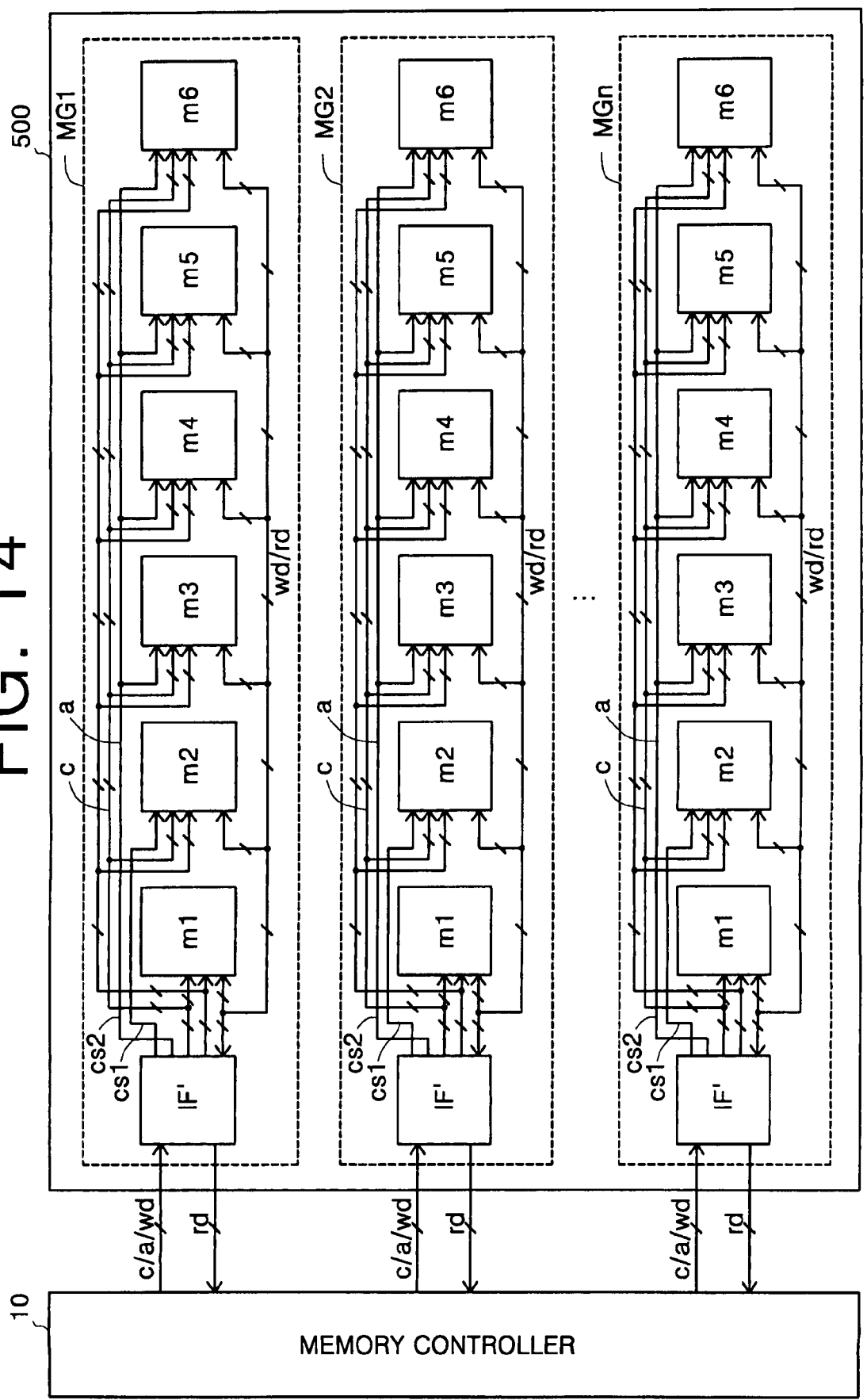
FIG. 14 is a block diagram illustrating a memory system including the memory controller and another memory module in accordance with another example embodiment of the present invention.

FIG. 14 is a block diagram illustrating a memory system including the memory controller 10 and a memory module 500 in accordance with another example embodiment of the present invention. In the example embodiment of FIG. 14, the memory module 500 may include four memories of third to sixth memories m3 to m6 included in each of n groups of memory units MG1 to MGn.

in the example embodiment of FIG. 14, the first and second memories m1 and m2 of FIG. 14 may be enabled in response to the first chip selection signal received from the first chip selection signal line cs1, and the third to sixth memories m3 to m6 may be enabled in response to the second chip selection signal received from the second chip selection signal line cs2. In an example, the interface IF' of FIG. 14 may include the memory m0 similar to the interface of FIG. 13, and the memory m0 may be enabled in response to the first chip selection signal.

In the example embodiment of FIG. 14, write/read data lines of the memory module 500 may be shared by the first to sixth memories m1 to m6. In an alternative example, the write/read data lines may be separated.

Figure 15:
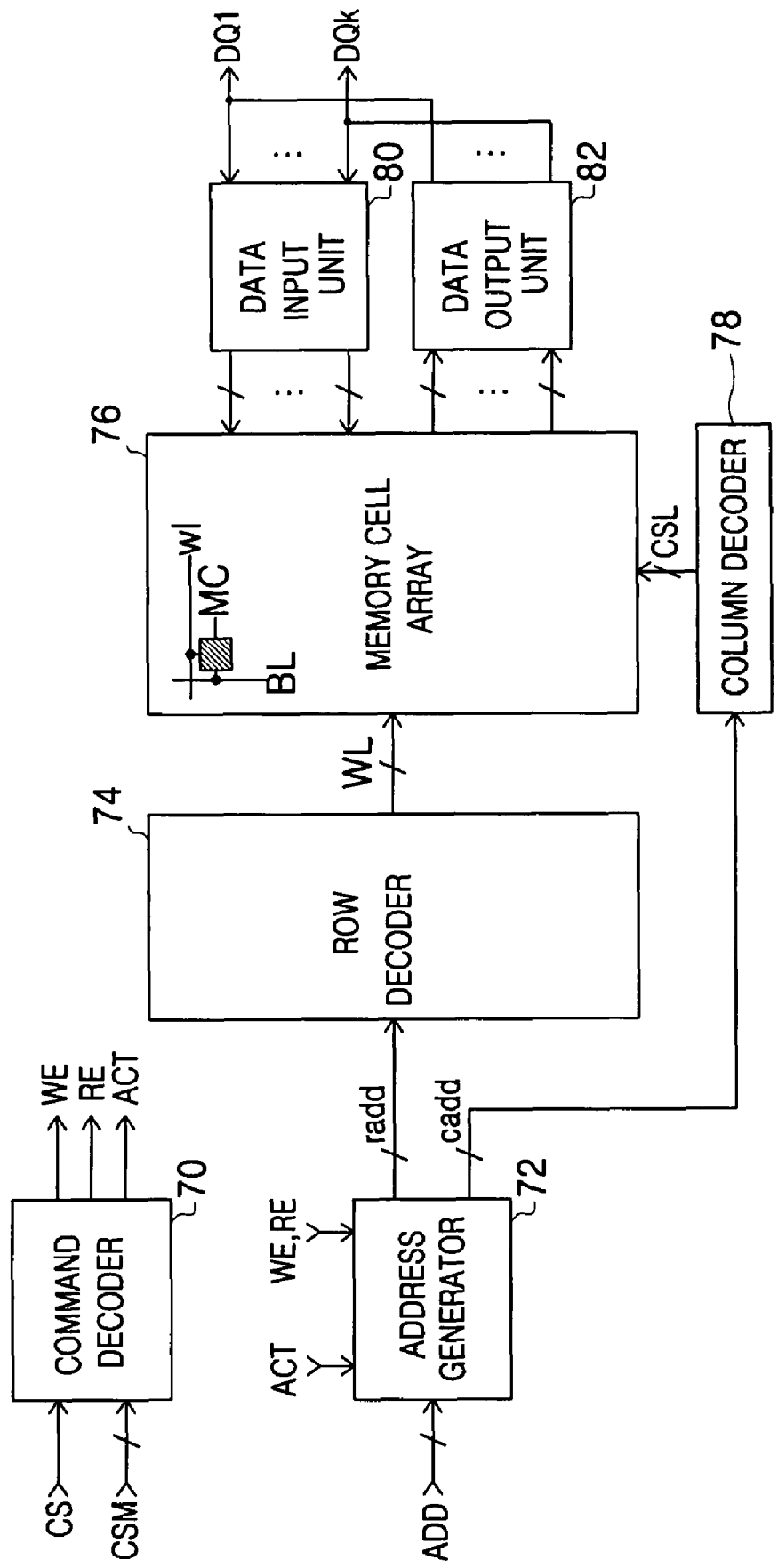
FIG. 15 is a diagram illustrating a memory module in accordance with another example embodiment of the present invention.

FIG. 15 is a diagram illustrating a memory module in accordance with another example embodiment of the present invention. In the example embodiment of FIG. 15, the memory module may include a command decoder 70, an address generator 72, a row decoder 74, a memory cell array 76, a column decoder 78, a data input unit 80 and a data output unit 82. The memory cell array 76 may include a memory cell MC connected between a word line wl and a bit line BL. In the example embodiment of FIG. 15, wl may denote a representative word line and BL may denote a representative bit line.

In the example embodiment of FIG. 15, the command decoder 70 may decode a chip selection signal CS and a command signal COM to generate a write command WE, a read command RE, and an active command ACT. The address generator 72 may receive an address ADD to generate a row address radd in response to the active command ACT, and may receive the address ADD to generate a column address cadd in response to the write command WE or, alternatively, the read command RE. The row decoder 74 may decode the row address radd to generate word selection signals WL, and the column decoder 76 may decode the column address cadd to generate a column selection signal CSL. The memory cell array 76 may write data in the memory cell MC connected between the bit line BL selected in response to the column selection signal CSL and the word line wl selected in response to the word selection signal WL, and may read data stored in the memory cell MC. The data input unit 80 may delay by the write latency, and may then receive each of serial data DQ1 to DQk and may convert the received serial data into parallel data to be input to the memory cell array 76. The data output unit 82 may convert each of the parallel data output from the memory cell array 76 to serial data, and may delay the converted serial data by the read latency to output each of serial data DQ1 to DQk.

While not illustrated in the example memory systems of FIGS. 3 through 15, any of the above described example memory systems may include pairs of differential read data lines if read data between a memory controller and an interface may be transmitted at higher data rates. In another example embodiment of the present invention, any of the above described example memory systems may include single write/read data lines if write/read data between an interface and memories may be transmitted at lower data rates.

In another example embodiment of the present invention, an interface need not be disposed in each of a plurality of memories, and rather may be disposed in each a given group having a plurality of memories, thereby simplifying a design and implementation of an example memory system.

Example embodiments of the present invention being thus described, it will be obvious that the same may be varied in many ways. For example, while the example embodiments of the present invention are above described with respect to a memory module including interfaces in connection with a memory controller, it is understood that other example embodiments of the present invention may be configured to have the interfaces connected to any well-known circuit which provides packet command and/or receives read data.

Such variations are not to be regarded as a departure from the spirit and scope of example embodiments of the present invention, and all such modifications as would be obvious to one skilled in the art are intended to be included within the scope of the following claims.

What is claimed is:

1. A memory module, comprising:
a plurality of memory units, each of the plurality of memory units including an interface receiving a packet command to generate a command signal and an address, extracting write data from the received packet command and transferring the extracted write data to memory during a write operation and receiving read data during a read operation and at least one memory device receiving the extracted write data during the write operation, and configured to output the read data during the read operation, wherein
the interface transfers the extracted write data via an n-bit data line, where n is greater than zero, during the write operation, the interface receives the read data via the n-bit data line during the read operation and transmits the received read data via read data lines, the at least one memory device including at least two first memories, each of the at least two first memories directly receiving the command signal and the address in common and outputting the read data via the n-bit data line during the read operation,
wherein the at least one memory device further includes at least two second memories, each of the at least two second memories directly receiving the command signal and the address in common, receiving the write data transmitted to the n-bit data line during the write operation, and transmitting the read data to the n-bit data line during the read operation.

2. The memory module of claim 1, wherein the n-bit data line is connected to the interface and the at least two first memories in common, the write data includes of at least two groups of write data, the at least two groups of write data being sequentially output to the at least two first memories during the write operation, the read data includes at least two groups of read data, the at least two groups of read data being sequentially output from the at least two first memories during the read operation.

3. The memory module of claim 2, wherein if a first of the at least two first memories has a write latency of n, where n is an integer greater than zero, a read latency of m, where m is an integer greater than one, a burst length of k, where k is an integer greater than one, and a clock period of j, where j is an integer greater than one, corresponding to the burst length, a second of the at least two first memories has a write latency of n+j, a read latency of m+j and a burst length of k.

4. The memory module of claim 1, wherein the n-bit data line includes at least two groups of write/read data lines separately connected between the interface and each of the at least two first memories, the write data including at least two groups of write data, the at least two groups of write data concurrently transmitted to the at least two first memories, the read data including at least two groups of read data, the at least two groups of read data concurrently output from the at least two first memories, respectively.

5. The memory module of claim 4, wherein corresponding write latencies, read latencies, and burst lengths for each of the at least two first memories are the same.

6. The memory module of claim 1, wherein the packet command includes a first chip selection signal for enabling operations of the at least two first memories and a second chip selection signal for enabling operations of the at least two second memories.

7. The memory module of claim 6, wherein the n-bit data line include first write/read data lines connected between the interface and a first of the at least two first memories and a first of the at least two second memories in common, and second write/read data lines connected between the interface and a second of the at least two first memories and a second of the at least two second memories in common.

8. The memory module of claim 7, wherein if the first of the at least two first memories and the first of the at least two second memories have a write latency of n, where n is an integer greater than zero, a read latency of m, where m is an integer greater than one, a burst length of k, where k is an integer greater than one, and a clock period of j, where j is an integer greater than one, corresponding to the burst length, the second of the at least two first memories and the second of the at least two second memories have a write latency of n+j, a read latency of m+j and a burst length of k.

9. The memory module of claim 1, wherein the n-bit data line is connected between the interface and the at least two first memories and the at least two second memories in common.

10. The memory module of claim 9, wherein corresponding write latencies, read latencies, and burst lengths of the at least two first memories and the at least two second memories, respectively, are the same.

11. The memory module of claim 1, wherein the interface receives the packet command transmitted at a first operating frequency and transfers the extracted write data included in the packet command at a second operating frequency during the write operation, and receives the read data at the second operating frequency from one or more of the at least two first memories and transmits the read data to the n-bit data line at the first operating frequency during the read operation, the first operating frequency being higher than the second operating frequency.

12. The memory module of claim 1, wherein the read data lines include pairs of differential data lines for transmitting differential data, and the n-bit data line includes single data lines for transmitting single data.

13. A memory system, comprising:
  the memory module of claim 1; and
  a memory controller transmitting the packet command to the memory module via the n-bit data line, the transmitted packet command associated with one of a write operation and a read operation, the memory controller receiving the read data from the memory module via the read data lines during a read operation.

14. The memory module of claim 1, wherein the interface includes a first memory, the extracted write data including first write data and second write data, the interface storing the first write data in the first memory and transferring the second write data via the n-bit data line during a write operation, the interface enabling the first memory to generate first read data, receiving second read data via the n-bit data line and outputting the first and second read data to read data lines during a read operation, the at least one memory device receiving the second write data via the n-bit data line during the write operation and transmitting the second read data via the n-bit data line during the read operation.

15. The memory module of 14, wherein the n-bit data line is connected between the interface and the at least two second memories in common, the second write data includes at least two groups of third write data, the at least two groups of third write data sequentially output to the at least two second memories during the write operation, the second read data including at least two groups of third read data, the at least two groups of third read data sequentially output from the at least two second memories during the read operation.

16. The memory module of claim 15, wherein if a first of the at least two second memories has a write latency of n, where n is an integer greater than zero, a read latency of m, where m is an integer greater than one, a burst length of k, where k is an integer greater than one, and a clock period of j, where j is an integer greater than one, corresponding to the burst length, a second of the at least two second memories has a write latency of n+j, a read latency of m+j and a burst length of k.

17. The memory module of claim 14, wherein the n-bit data line includes at least two groups of write/read data lines separately connected between the interface and each of the at least two second memories.

18. The memory module of claim 17, wherein corresponding write latencies, read latencies, and burst lengths of each of the at least two second memories are the same.

19. The memory module of claim 14, wherein the interface receives the packet command transmitted at a first operating frequency and transfers the extracted write data included in the packet command at a second operating frequency during the write operation, the interface receiving the read data transmitted at the second operating frequency from the at least one memory device and transmitting the read data at the first operating frequency during the read operation via the read data lines, the first operating frequency being higher than the second operating frequency.

20. The memory module of claim 14, wherein the read data lines include pairs of differential data lines for transmitting differential data, and the n-bit data line includes single data lines for transmitting single data.

21. A memory system, comprising:
  the memory module of claim 14; and
  a memory controller transmitting the packet command to the memory module via the n-bit data line, the transmitted packet command associated with one of a write operation and a read operation, the memory controller receiving the read data from the memory module via the read data lines during a read operation.

22. The memory module of claim 1, wherein the interface includes a first memory, the interface configured to either store the extracted write data in the first memory or transfer the extracted write data via the n-bit data line during a write operation, the interface further configured to receive read data generated at the first memory or received via the n-bit data line and to output the received read data via read data lines during a read operation, the at least one memory device receiving the write data via the n-bit data line during the write operation, and transmitting the read data via the n-bit data line during the read operation.

23. The memory module of claim 22, wherein the n-bit data line is connected between the interface and the at least two second memories in common, the second write data include at least two groups of third write data, the at least two groups of third write data sequentially output to the at least two second memories during the write operation, the second read data including at least two groups of third read data, the at least two groups of third read data sequentially output from the at least two second memories during the read operation.

24. The memory module of claim 23, wherein if a first of the at least two second memories has a write latency of n, where n is an integer greater than zero, a read latency of m, where m is an integer greater than one, a burst length of k, where k is an integer greater than one, and a clock period of j, where j is an integer greater than one, corresponding to the burst length, a second of the at least two second memories has a write latency of n+j, a read latency of m+j and a burst length of k.

25. The memory module of claim 22, wherein the n-bit data line includes at least two groups of write/read data lines separately connected between the interface and each of the at least two second memories.

26. The memory module of claim 22, wherein corresponding write latencies, read latencies, and burst lengths of each of the at least two second memories are the same.

27. The memory module of claim 22, wherein the interface receives the packet command transmitted at a first operating frequency and transfers the extracted write data at a second operating frequency during the write operation, and the interface receives the read data at the second operating frequency from the memory device and transmits the read data at the first operating frequency during the read operation, the first operating frequency being higher than the second operating frequency.

28. The memory module of claim 22, wherein the read data lines include pairs of differential data lines for transmitting differential data, and the n-bit data line includes single data lines for transmitting single data.

29. A memory system, comprising:
  the memory module of claim 22; and
  a memory controller transmitting the packet command to the memory module via the n-bit data line, the transmitted packet command associated with one of a write operation and a read operation, the memory controller receiving the read data from the memory module via the read data lines during a read operation.

30. The memory module of claim 1, wherein the interface is connected to the at least one memory via internal the n-bit data line and the interface is connected to a memory controller at least via external read data lines.

31. The memory module of claim 30, wherein the internal n-bit data line is configured to transfer signals at lower speeds than the external read data lines.

32. The memory module of claim 30, wherein read data is reported to from the interface to the memory controller via the read data lines, and read and write data is exchanged between the interface and the at least one memory during read and write operations, respectively.

33. A memory system, comprising:

the memory module of claim 1; and a memory controller transmitting the packet command to the memory module via the n-bit data line, the transmitted packet command associated with one of a write operation and a read operation, the memory controller receiving the read data from the memory module via the read data lines during a read operation.

34. The memory module of claim 1, wherein the interface is connected to the at least two first memories through the n-bit data line, the interface is configured to transfer the extracted write data to at least one of the at least two memories via the n-bit data line during the write operation, and the at least two memories are configured to output the read data to the interface via the n-bit data line during the read operation.

* * * * *